United States Patent
Wu et al.

(10) Patent No.: US 11,917,619 B2
(45) Date of Patent: Feb. 27, 2024

(54) ANCHOR DEVICE ASSOCIATION FOR SIDELINK POSITIONING

(71) Applicant: QUALCOMM Incorporated, San Diego, CA (US)

(72) Inventors: Shuanshuan Wu, San Diego, CA (US); Dan Vassilovski, Del Mar, CA (US); Kapil Gulati, Belle Mead, NJ (US); Gabi Sarkis, San Diego, CA (US); Gene Wesley Marsh, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 17/461,692

(22) Filed: Aug. 30, 2021

(65) Prior Publication Data

US 2023/0061043 A1  Mar. 2, 2023

(51) Int. Cl.
*H04W 76/14* (2018.01)
*H04W 72/20* (2023.01)

(52) U.S. Cl.
CPC .......... *H04W 72/20* (2023.01); *H04W 76/14* (2018.02)

(58) Field of Classification Search
CPC ......... H04W 76/14; H04L 12/28; H04L 12/50
USPC ................................ 370/329, 395, 400, 403
See application file for complete search history.

(56) References Cited

U.S. PATENT DOCUMENTS

2022/0015056 A1* 1/2022 Choi ...................... H04W 4/40
2022/0039052 A1* 2/2022 Choi ...................... G01S 13/765

* cited by examiner

*Primary Examiner* — Dang T Ton
(74) *Attorney, Agent, or Firm* — Polsinelli

(57) ABSTRACT

Disclosed are techniques for performing wireless communication. In some aspects, a wireless communication device may identify a plurality of sidelink positioning anchor devices. Based on one or more parameters associated with each of the plurality of sidelink positioning anchor devices, the wireless communication device may associate with one or more sidelink positioning anchor devices from the plurality of sidelink positioning anchor devices.

26 Claims, 14 Drawing Sheets

ANCHOR DEVICE ASSOCIATION FOR SIDELINK POSITIONING

FIELD OF THE DISCLOSURE

Aspects of the present disclosure generally relate to wireless communication. In some implementations, examples are described for performing anchor association for device-to-device positioning (e.g., PC5 sidelink positioning, Dedicated Short Range Communication (DSRC) sidelink positioning, and/or other device-to-device positioning).

BACKGROUND OF THE DISCLOSURE

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

Aspects of LTE, 5G, and/or other communications protocols may support direct communications between devices, which may be referred to as sidelink communications. As used herein, sidelink or sidelink communications generally refers to any direct device-to-device communication protocol. For example, the term sidelink may refer to 3GPP sidelink (e.g., using a PC5 sidelink interface). Sidelink may also refer to a Wi-Fi protocol for direct device-to-device communications, referred to as Dedicated Short Range Communication (DSRC) protocol. As the demand for mobile broadband access and general communications continues to increase, further improvements in 5G, LTE, and other radio access technologies, as well as other communications technologies (e.g., WiFi, etc.), remain useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one example, a method is provided for wireless communication. The method may include: identifying, by a user equipment (UE), a plurality of sidelink positioning anchor devices; and based on one or more parameters associated with each of the plurality of sidelink positioning anchor devices, associating the UE with one or more sidelink positioning anchor devices from the plurality of sidelink positioning anchor devices.

In another example, a wireless communication device for wireless communication is provided that includes at least one memory and at least one processor (e.g., configured in circuitry) communicatively coupled to the memory. The at least one processor may be configured to: identify a plurality of sidelink positioning anchor devices; and based on one or more parameters associated with each of the plurality of sidelink positioning anchor devices, associate the wireless communication device with one or more sidelink positioning anchor devices from the plurality of sidelink positioning anchor devices.

In another example, a non-transitory computer-readable medium of a wireless communication device is provided that includes stored thereon at least one instruction that, when executed by one or more processors, may cause the one or more processors to: identify a plurality of sidelink positioning anchor devices; and based on one or more parameters associated with each of the plurality of sidelink positioning anchor devices, associate the wireless communication device with one or more sidelink positioning anchor devices from the plurality of sidelink positioning anchor devices.

In another example, an apparatus for wireless communication is provided. The apparatus may include: means for identifying, by a user equipment (UE), a plurality of sidelink positioning anchor devices; and means for associating the UE with one or more sidelink positioning anchor devices from the plurality of sidelink positioning anchor devices based on one or more parameters associated with each of the plurality of sidelink positioning anchor devices.

In another example, a method for wireless communication is provided. The method may include: receiving, by a sidelink positioning anchor device, a positioning query message from a user equipment (UE); determining at least one measurement associated with the UE in response to the positioning query message; and sending the at least one measurement to the UE.

In another example, a sidelink positioning anchor device is provided that includes at least one memory and at least one processor (e.g., configured in circuitry) communicatively coupled to the memory. The at least one processor may be configured to: receive a positioning query message from a user equipment (UE); determine at least one measurement associated with the UE in response to the positioning query message; and send the at least one measurement to the UE.

In another example, a non-transitory computer-readable medium is provided that includes stored thereon at least one instruction that, when executed by one or more processors, may cause the one or more processors to: receive a positioning query message from a user equipment (UE); determine at least one measurement associated with the UE in response to the positioning query message; and send the at least one measurement to the UE.

In another example, an apparatus for wireless communication is provided. The apparatus may include: means for receiving a positioning query message from a user equipment (UE); means for determining at least one measurement associated with the UE in response to the positioning query message; and means for sending the at least one measurement to the UE.

In another example, a method for wireless communication is provided. The method may include: receiving, by a network entity from a user equipment (UE), one or more parameters corresponding to a plurality of sidelink positioning anchor devices; selecting, based on the one or more parameters, a subset of sidelink positioning anchor devices from the plurality of sidelink positioning anchor devices, wherein the subset of sidelink positioning anchor devices are associated with the UE for sidelink positioning; and transmitting an indication of the subset of sidelink positioning anchor devices to the UE.

In another example, a base station is provided that includes at least one memory and at least one processor (e.g., configured in circuitry) communicatively coupled to the memory. The at least one processor may be configured to: receive, from a user equipment (UE), one or more parameters corresponding to a plurality of sidelink positioning anchor devices; select, based on the one or more parameters, a subset of sidelink positioning anchor devices from the plurality of sidelink positioning anchor devices, wherein the subset of sidelink positioning anchor devices are associated with the UE for sidelink positioning; and transmit an indication of the subset of sidelink positioning anchor devices to the UE.

In another example, a non-transitory computer-readable medium is provided that includes stored thereon at least one instruction that, when executed by one or more processors, may cause the one or more processors to: receive, from a user equipment (UE), one or more parameters corresponding to a plurality of sidelink positioning anchor devices; select, based on the one or more parameters, a subset of sidelink positioning anchor devices from the plurality of sidelink positioning anchor devices, wherein the subset of sidelink positioning anchor devices are associated with the UE for sidelink positioning; and transmit an indication of the subset of sidelink positioning anchor devices to the UE.

In another example, an apparatus for wireless communication is provided. The apparatus may include: means for receiving, from a user equipment (UE), one or more parameters corresponding to a plurality of sidelink positioning anchor devices; means for selecting, based on the one or more parameters, a subset of sidelink positioning anchor devices from the plurality of sidelink positioning anchor devices, wherein the subset of sidelink positioning anchor devices are associated with the UE for sidelink positioning; and means for transmitting an indication of the subset of sidelink positioning anchor devices to the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
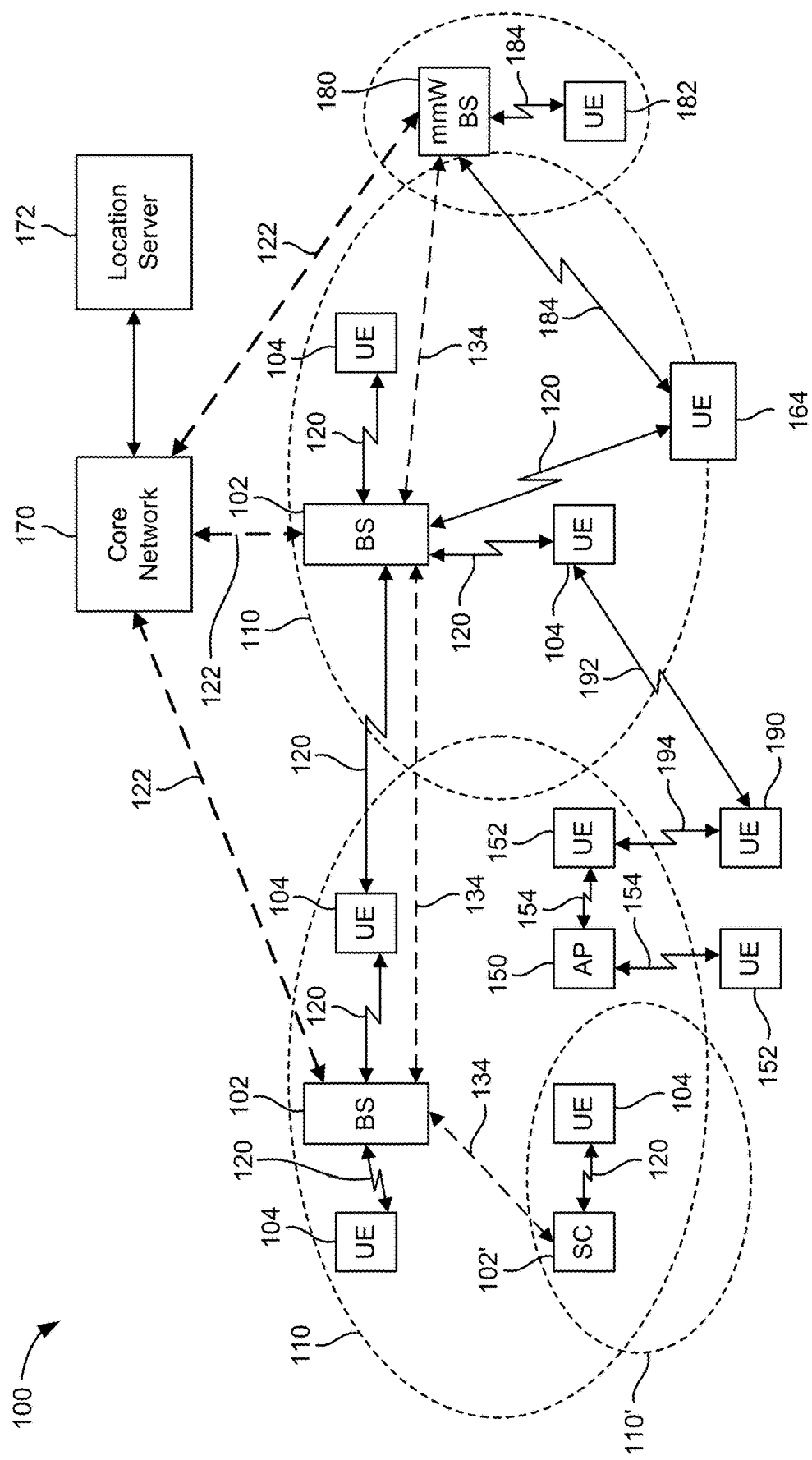
FIG. 1 illustrates an exemplary wireless communications system, according to aspects of the disclosure.

Certain aspects and embodiments of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects and embodiments described herein may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

Wireless communication networks are deployed to provide various communication services such as voice, video, packet data, messaging, broadcast, and the like. A wireless communication network may support both access links and sidelinks for communication between wireless devices. An access link may refer to any communication link between a client device (e.g., a user equipment (UE), a station (STA), or other client device) and a base station (e.g., a 3GPP gNB, a 3GPP eNB, a Wi-Fi access point (AP), or other base station). For example, an access link may support uplink signaling, downlink signaling, connection procedures, etc.

A sidelink may refer to any communication link between client devices (e.g., UEs, STAB, etc.). For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs. In some examples, sidelink communications may be transmitted using a licensed frequency spectrum or an unlicensed frequency spectrum (e.g., 5 GHz or 6 GHz). As used herein, the term sidelink may refer to 3GPP sidelink (e.g., using a PC5 sidelink interface), Wi-Fi direct communications (e.g., according to a Dedicated Short Range Communication (DSRC) protocol), or using any other direct device-to-device communication protocol.

In some configurations, a UE may use sidelink communications to implement sidelink positioning algorithms. In some cases, sidelink positioning algorithms may be used to obtain a higher degree of accuracy than may be obtained by using more traditional positioning techniques such as a Global Navigation Satellite System (GNSS). For instance, some sidelink applications (e.g., V2X applications and/or other applications) have very high accuracy requirements. In one illustrative example, sub-meter level accuracy may be necessary to support vehicle maneuver coordination (e.g., coordinating a lane change, automatic breaking of a target vehicle based on the location of another vehicle, etc.). In such cases, a large bandwidth (e.g., approximately 80 MHz or higher) positioning signal (e.g., Positioning Reference Signal (PRS), etc.) transmission may be necessary. Sidelink positioning signals SL PRS may thus be transmitted over an intelligent transport system (ITS) band, a licensed band, or an unlicensed band, depending on regional regulations, positioning Quality of Service (QoS) requirements, etc.

Sidelink positioning may support both relative and absolute positioning. For instance, relative positioning (also referred to as ranging) can include determining a distance between two UEs (e.g., between a pedestrian UE and an RSU, between two pedestrian UEs, between two vehicle UEs, between a pedestrian UE and a vehicle UE, etc.). Absolute positioning can include determining a global location (e.g., by determining geographical coordinates) of a target UE.

In some cases, sidelink positioning may be performed based on measurement of one or more sidelink positioning signals (e.g., a sidelink PRS, a Channel State Information (CSI) reference signal (CSI-RS), Sounding Reference Signal (SRS), etc.) transmitted over sidelink from one UE to another UE. For instance, a sidelink PRS can be transmitted over sidelink. The positioning can be based on measurements of Time of Arrival (ToA), Time Difference of Arrival (TDoA), Angle of Arrival (AoA), Round-Trip Time (RTT), or other positioning-based determination of the sidelink PRS, CSI-RS, SRS, etc.

In some cases, transmission of positioning assistance messages may be needed for positioning. For instance, a positioning assistance message may be sent prior to and/or following a sidelink positioning signal (e.g., PRS) transmission. The positioning assistance message can carry sidelink positioning related configuration information (e.g., PRS configuration, etc.), sidelink positioning related measurements (e.g., ToA measurements, TDoA measurements, RTT measurements, etc.), etc.

Sidelink positioning may be performed with or without network involvement. For example, the UE may perform scheduling of sidelink positioning resources autonomously (Mode 2) without network involvement. In another example, scheduling of sidelink positioning resources may be performed by a base station (Mode 1). In some cases, one or both of the sidelink positioning signals (e.g., PRS, etc.) and the positioning assistance messages may be scheduled by a base station (e.g., a gNB, an eNB, an AP, etc.) in Mode 1 operation.

In some examples, a UE may implement sidelink positioning algorithms by associating with one or more other UEs that may operate as sidelink positioning anchor devices. Depending on the sidelink positioning algorithm/method to be employed to determine a position of the UE, the number of sidelink positioning anchor devices that are needed can vary. In one example, one or two sidelink positioning anchor devices (e.g., RSUs, pedestrian UEs, vehicle UEs, etc.) may be needed when positioning can leverage UE dynamics (e.g., vehicle UE dynamics). For instance, multiple positions of a vehicle UE can be used for positioning based on multiple positioning signals (e.g., PRSs) received by the vehicle UE as the vehicle UE moves locations. In another example, three sidelink positioning anchor devices may be needed when positioning is based on a TDoA-like approach.

In some cases, a UE may determine that the number of available sidelink positioning anchor devices exceeds the number of sidelink positioning anchor devices necessary to implement a sidelink positioning algorithm. Consequently, the UE should be able to perform sidelink positioning using a subset of the available sidelink positioning anchor devices. However, there is a lack of any mechanism for determining a subset of sidelink positioning anchor devices from a group of available sidelink positioning anchor devices.

Systems, apparatuses, processes (also referred to as methods), and computer-readable media (collectively referred to as "systems and techniques") are described herein for performing anchor association for sidelink positioning. The systems and techniques provide the ability for client devices (e.g., UEs) to implement sidelink positioning in a manner that utilizes an optimal configuration of sidelink positioning anchor devices. As noted above, the sidelink communications may be performed according to 3GPP communication protocols (e.g., using a PC5 sidelink interface according to LTE, 5G, etc.), Wi-Fi direct communication protocols (e.g., DSRC protocol), or using any other device-to-device communication protocol.

In some aspects, a UE (referred to herein as a target UE) may identify a group of sidelink positioning anchor devices that are available for use in implementing a sidelink positioning algorithm. Each sidelink positioning anchor device from the group of sidelink positioning anchor devices may include a device having known location. For instance, a sidelink positioning anchor device can include an RSU, a pedestrian UE (e.g., a mobile device, a tablet computer, a wearable device, or other pedestrian UE), a vehicle UE, and/or other device. In some cases, the UE may associate with a subset of positioning anchor devices (including one or more sidelink positioning anchor devices) from the group of available sidelink positioning anchor devices in order to implement sidelink positioning. The target UE may be positioned with assistance from, or based on location of, the one or more sidelink positioning anchor devices in the subset.

In some examples, the one or more associated sidelink positioning anchor devices may be determined based on one or more parameters associated with the group of sidelink positioning anchor devices. In some aspects, the parameters may include a power measurement (e.g., a reference signal received power (RSRP)) measurement, a distance measurement, a line of sight measurement, an anchor device capability, an anchor device category, any combination thereof, and/or other parameter(s).

As described herein, in some cases the measurement of the one or more parameters may be performed by the target UE. For example, the target UE can measure the one or more parameters based on one or more received reference signals (e.g., a PRS, CSI-RS, SRS, etc.) transmitted by one or more sidelink positioning anchor devices. In another example, the one or more measurements may be performed by one or more sidelink positioning anchor devices.

In some examples, UE-based and/or network-based association of a target UE and one or more sidelink positioning anchor devices can be performed. For instance, for the UE-based association, the target UE or an anchor UE may determine the UE association based on the measurements of the one or more parameters. For the network-based assignment, the target UE or one or more sidelink positioning anchor devices may report the parameter measurements to a network entity (e.g., a gNB, an eNB, an AP, a location server such as a location management function (LMF), or other network entity). The network entity or another network entity may perform the association of the target UE and the one or more sidelink positioning anchor devices based at least on the received measurements.

Additional aspects of the present disclosure are described in more detail below.

As used herein, the term "communication unit" is a system, device, or component of a UE (e.g., a vehicle, a user device, etc.) and/or other device (e.g., a road side unit (RSU) or other device) that may include a telematics control unit (TCU), a network access device (NAD), a modem, a subscriber identity module (SIM), a transceiver (or individual receiver and/or transmitter), any combination thereof, and/or other system, device, or component configured to perform wireless communication operations.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable device (e.g., smart watch, glasses, an extended reality (XR) device such as a virtual reality (VR) headset, an augmented reality (AR) headset or glasses, or a mixed reality (MR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "user device," a "user terminal" or UT, a "client device," a "wireless device," a "wireless communication device," a "subscriber device," a "subscriber terminal," a "subscriber station," a "mobile device," a "mobile terminal," a "mobile station," or variations thereof. Generally, UEs may communicate with a core network via a RAN, and through the core network the UEs may be connected with external networks such as the Internet and with other UEs. UEs may also communicate with other UEs and/or other devices as described herein. In some cases, other mechanisms of connecting to the core network, the Internet, and other UEs are also possible for the UEs, such as over wired access networks, wireless local area network (WLAN) networks (e.g., based on IEEE 802.11, based on ultra-wideband (UWB), etc.), and so on.

A base station may operate according to one of several RATs in communication with UEs, RSUs, and/or other devices, depending on the network in which it is deployed.

In some cases, a base station may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, a forward traffic channel, etc.). As used herein the term traffic channel (TCH) may refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

A road side unit (RSU) is a device that may transmit and receive messages over a communications link or interface (e.g., a cellular-based sidelink or PC5 interface, an 802.11 or WiFi™ based Dedicated Short Range Communication (DSRC) interface, and/or other interface) to and from one or more UEs, other RSUs, and/or base stations. An example of messages that may be transmitted and received by an RSU includes vehicle-to-everything (V2X) messages, which are described in more detail below. RSUs may be located on various transportation infrastructure systems, including roads, bridges, parking lots, toll booths, and/or other infrastructure systems. In some examples, an RSU may facilitate communication between UEs (e.g., vehicles, pedestrian user devices, and/or other UEs) and the transportation infrastructure systems. In some implementations, a RSU may be in communication with a server, base station, and/or other system that may perform centralized management functions.

An RSU may communicate with a communications system of a UE. For example, an intelligent transport system (ITS) of a UE (e.g., a vehicle and/or other UE) may be used to generate and sign messages for transmission to an RSU and to validate messages received from an RSU. An RSU may communicate (e.g., over a PC5 interface, DSRC interface, etc.) with vehicles traveling along a road, bridge, or other infrastructure system in order to obtain traffic-related data (e.g., time, speed, location, etc. of the vehicle). In some cases, in response to obtaining the traffic-related data, the RSU may determine or estimate traffic congestion information (e.g., a start of traffic congestion, an end of traffic congestion, etc.), a travel time, and/or other information for a particular location. In some examples, the RSU may communicate with other RSUs (e.g., over a PC5 interface, DSRC interface, etc.) in order to determine the traffic-related data. The RSU may transmit the information (e.g., traffic congestion information, travel time information, and/or other information) to other vehicles, pedestrian UEs, and/or other UEs. For example, the RSU may broadcast or otherwise transmit the information to any UE (e.g., vehicle, pedestrian UE, etc.) that is in a coverage range of the RSU.

According to various aspects, FIG. 1 illustrates an example of a wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a 4G/LTE network, or gNBs where the wireless communications system 100 corresponds to a 5G/NR network, or a combination of both, and the small cell base stations may include femtocells, picocells, microcells, etc.

The base stations 102 may collectively form a radio access network (RAN) and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5 GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs etc.) that communicate with one or more UEs 104, base stations 102, APs 150, etc. utilizing the ultra-wideband (UWB) spectrum. The UWB spectrum may range from 3.1 to 10.5 GHz.

The small cell base station 102' may operate in a licensed and/or an unlicensed frequency spectrum (e.g., utilizing LTE or NR technology and use the same 5 GHz unlicensed frequency spectrum as used by the WLAN AP 150). The wireless communications system 100 may further include a millimeter wave (mmW) base station 180 that may operate in mmW frequencies and/or near mmW frequencies in communication with a UE 182. In some cases, mmW frequencies may be referred to as the FR2 band (e.g., including a frequency range of 24250 MHz to 52600 MHz). In some examples, the wireless communications system 100 may include one or more base stations (referred to herein as "hybrid base stations") that operate in both the mmW frequencies (and/or near mmW frequencies) and in sub-6 GHz frequencies (referred to as the FR1 band, e.g., including a frequency range of 450 to 6000 MHz). In some examples, the mmW base station 180, one or more hybrid base stations (not shown), and the UE 182 may utilize beamforming (transmit and/or receive) over a mmW communication link 184 to compensate for the extremely high path loss and short range. The wireless communications system 100 may further include a UE 164 that may communicate with a macro cell base station 102 over a communication link 120 and/or the mmW base station 180 over a mmW communication link 184.

In some examples, in order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, UWB, and so on.

Figure 2A:
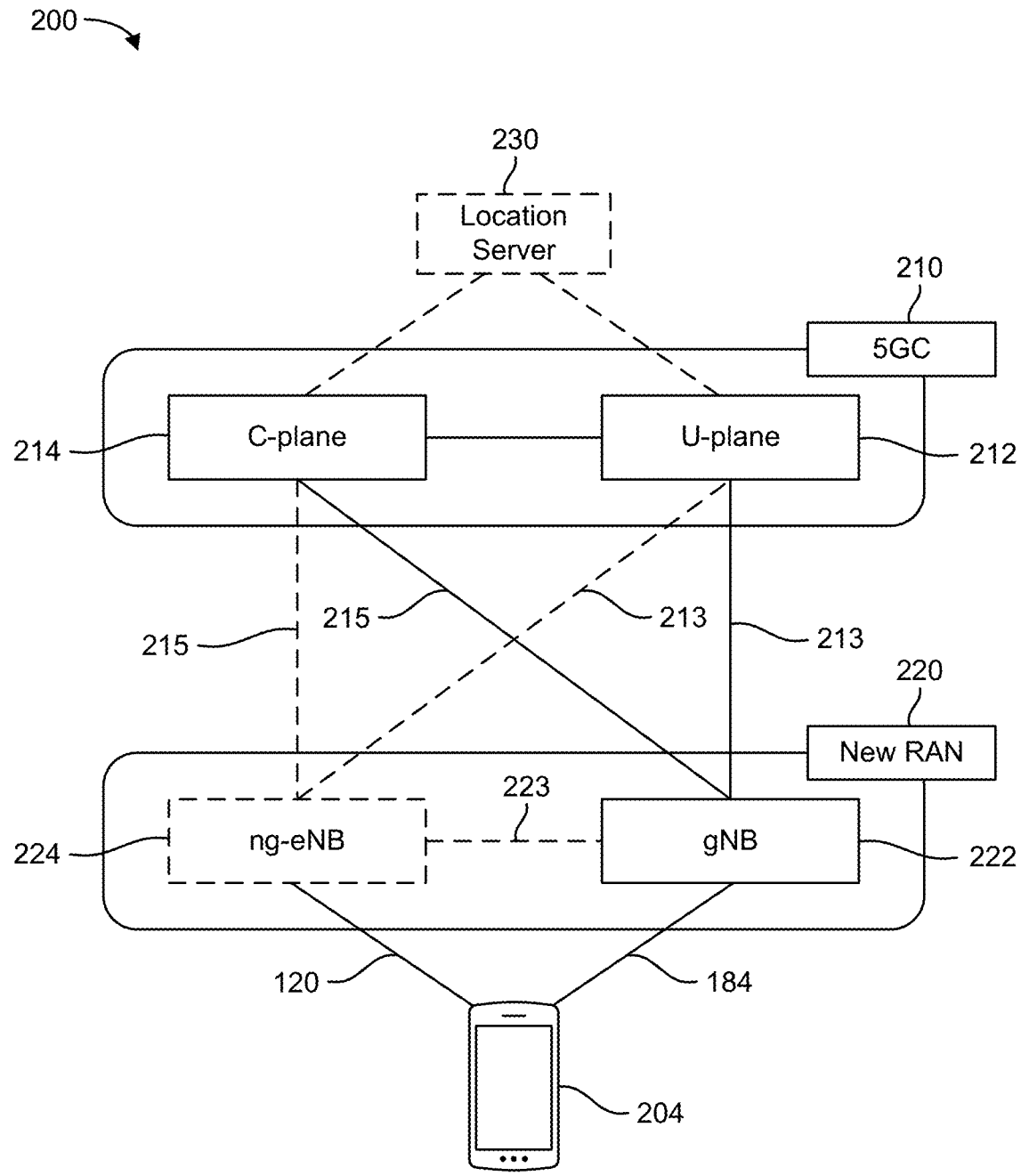
FIG. 2A and FIG. 2B illustrate examples of wireless network structures, according to aspects of the disclosure.

According to various aspects, FIG. 2A illustrates an example wireless network structure 200. For example, a 5GC 210 (also referred to as a Next Generation Core (NGC)) may be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1).

In some aspects, wireless network structure 200 may include location server 230, which may be in communication with the 5GC 210 to provide location assistance for UEs 204. The location server 230 may be implemented as a plurality of separate servers (e.g., physically separate servers, different software modules on a single server, different software modules spread across multiple physical servers, etc.), or alternately may each correspond to a single server.

The location server 230 may be configured to support one or more location services for UEs 204 that may connect to the location server 230 via the core network, 5GC 210, and/or via the Internet (not illustrated). Further, the location server 230 may be integrated into a component of the core network, or alternatively may be external to the core network. In some examples, the location server 230 may be operated by a carrier or provider of the 5GC 210, a third party, an original equipment manufacturer (OEM), or other party. In some cases, multiple location servers may be provided, such as a location server for the carrier, a location server for an OEM of a particular device, and/or other location servers. In such cases, location assistance data may be received from the location server of the carrier and other assistance data may be received from the location server of the OEM.

Figure 2B:
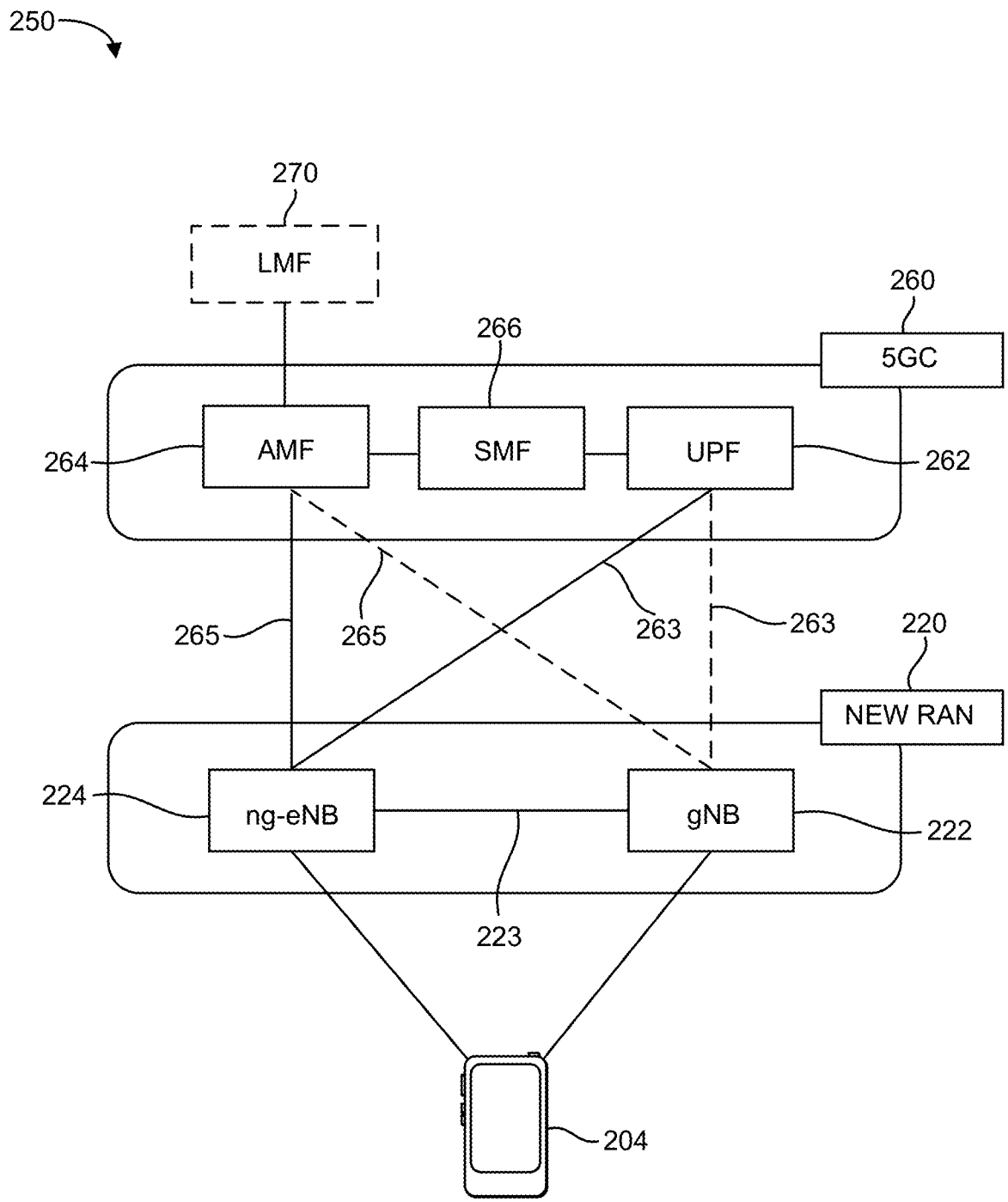

According to various aspects, FIG. 2B illustrates another example wireless network structure 250. In some examples, 5GC 260 may be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In some examples, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 may include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 may also interact with an authentication server function (AUSF) (not shown) and the UE 204, and may receive an intermediate key established as a result of the UE 204 authentication process.

In the case of authentication based on a UMTS (universal mobile telecommunications system) subscriber identity module (USIM), the AMF 264 may retrieve the security material from the AUSF. The functions of the AMF 264 may also include security context management (SCM). The SCM may receive a key from the SEAF that it may use to derive access-network specific keys. The functionality of the AMF 264 may also include location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 may also support functionalities for non-3GPP access networks.

In some cases, UPF 262 may perform functions that include serving as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink and/or downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. In some aspects, UPF 262 may also support transfer of location services messages over a user plane between the UE 204 and a location server, such as a secure user plane location (SUPL) location platform (SLP), not shown in FIG. 2B.

In some examples, the functions of SMF 266 may include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 may be referred to as the N11 interface.

In some aspects, wireless network structure 250 may include an LMF 270, which may be in communication with the 5GC 260 to provide location assistance for UEs 204. The LMF 270 may be implemented as a plurality of separate servers (e.g., physically separate servers, different software modules on a single server, different software modules spread across multiple physical servers, etc.), or alternately may each correspond to a single server. The LMF 270 may be configured to support one or more location services for UEs 204 that may connect to the LMF 270 via the core network, 5GC 260, and/or via the Internet (not illustrated). The SLP may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP may communicate with UEs 204 and external clients (not shown in FIG. 2B) over a user plane (e.g., using protocols intended to carry voice and/or data like the transmission control protocol (TCP) and/or IP).

In some cases, LMF 270 and/or the SLP may be integrated with a base station, such as the gNB 222 and/or the ng-eNB 224. When integrated with the gNB 222 and/or the ng-eNB 224, the LMF 270 and/or the SLP may be referred to as a "location management component," or "LMC." As used herein, references to LMF 270 and SLP include both the case in which the LMF 270 and the SLP are components of the core network (e.g., 5GC 260) and the case in which the LMF 270 and the SLP are components of a base station.

As described above, wireless communications systems support communication among multiple UEs. In various examples, wireless communications systems may be configured to support device-to-device (D2D) communication and/or vehicle-to-everything (V2X) communication. V2X may also be referred to as Cellular V2X (C-V2X). V2X communications may be performed using any radio access technology, such as LTE, 5G, WLAN, or other communication protocol. In some examples, UEs may transmit and receive V2X messages to and from other UEs, road side units (RSUs), and/or other devices over a direct communications link or interface (e.g., a PC5 or sidelink interface, an 802.11p DSRC interface, and/or other communications interface) and/or via the network (e.g., an eNB, a WiFi AP, and/or other network entity). The communications may be performed using resources assigned by the network (e.g., an eNB or other network device), resources pre-configured for V2X use, and/or using resources determined by the UEs (e.g., using clear channel assessment (CCA) with respect to resources of an 802.11 network).

V2X communications may include communications between vehicles (e.g., vehicle-to-vehicle (V2V)), communications between vehicles and infrastructure (e.g., vehicle-to-infrastructure (V2I)), communications between vehicles and pedestrians (e.g., vehicle-to-pedestrian (V2P)), and/or communications between vehicles and network severs (vehicle-to-network (V2N)). For V2V, V2P, and V2I communications, data packets may be sent directly (e.g., using a PC5 interface, using an 802.11 DSRC interface, etc.) between vehicles without going through the network, eNB, or gNB. V2X-enabled vehicles, for instance, may use a short-range direct-communication mode that provides 360° non line-of-sight (NLOS) awareness, complementing onboard line-of-sight (LOS) sensors, such as cameras, radio detection and ranging (RADAR), Light Detection and Ranging (LIDAR), among other sensors. The combination of wireless technology and onboard sensors enables V2X vehicles to visually observe, hear, and/or anticipate potential driving hazards (e.g., at blind intersections, in poor weather conditions, and/or in other scenarios). V2X vehicles may also understand alerts or notifications from other V2X-enabled vehicles (based on V2V communications), from infrastructure systems (based on V2I communications), and from user devices (based on V2P communications). Infrastructure systems may include roads, stop lights, road signs, bridges, toll booths, and/or other infrastructure systems that may communicate with vehicles using V2I messaging.

Depending on the desired implementation, sidelink communications may be performed according to 3GPP communication protocols sidelink (e.g., using a PC5 sidelink interface according to LTE, 5G, etc.), Wi-Fi direct communication protocols (e.g., DSRC protocol), or using any other device-to-device communication protocol. In some examples, sidelink communication may be performed using one or more Unlicensed National Information Infrastructure (U-NII) bands. For instance, sidelink communications may be performed in bands corresponding to the U-NII-4 band (5.850-5.925 GHz), the U-NII-5 band (5.925-6.425 GHz), the U-NII-6 band (6.425-6.525 GHz), the U-NII-7 band (6.525-6.875 GHz), the U-NII-8 band (6.875-7.125 GHz), or any other frequency band that may be suitable for performing sidelink communications.

Figure 3:
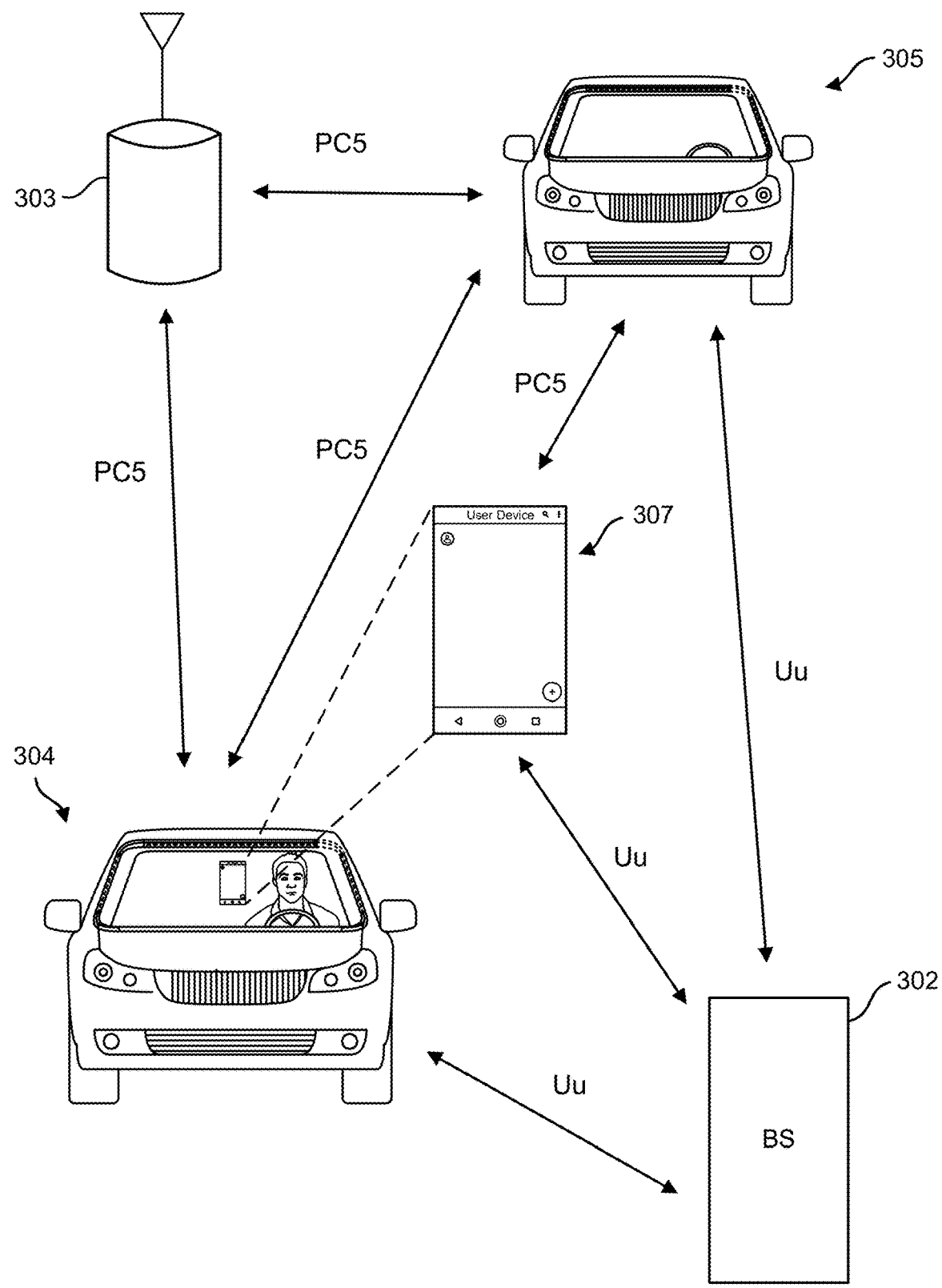
FIG. 3 is a diagram illustrating an example of various user equipment (UEs) communicating over direct communication interfaces (referred to as a PC5 interface or a sidelink interface) and wide area network (Uu) interfaces, according to aspects of the disclosure.

FIG. 3 illustrates examples of different communication mechanisms used by various UEs. In one example, FIG. 3 illustrates a vehicle 304, a vehicle 305, and a roadside unit (RSU) 303 that may communicate with each other using PC5 signaling interfaces. In addition, the vehicle 304 and the vehicle 305 may communicate with a base station 302 (shown as BS 302) using a network (Uu) interface. In some examples, the base station 302 may include a gNB (e.g., base stations 102). FIG. 3 also illustrates a user device 307 communicating with the base station 302 using a network (Uu) interface. In some aspects, functionalities may be transferred from a vehicle (e.g., vehicle 304) to a user device (e.g., user device 307) based on one or more characteristics or factors (e.g., temperature, humidity, etc.). In one illustrative example, V2X functionality may be transitioned from the vehicle 304 to the user device 307, after which the user device 307 may communicate with other vehicles (e.g., vehicle 305) over a PC5 interface, as shown in FIG. 3.

While PC5 interfaces are shown in FIG. 3, the various UEs (e.g., vehicles, user devices, etc.) and RSU(s) may communicate directly using any suitable type of direct interface, such as an 802.11 DSRC interface, a Bluetooth™ interface, and/or other interface. For example, a vehicle may communicate with a user device over a direct communications interface (e.g., using PC5 and/or DSRC), a vehicle may communicate with another vehicle over the direct communications interface, a user device may communicate with another user device over the direct communications interface, a UE (e.g., a vehicle, user device, etc.) may communicate with an RSU over the direct communications interface, an RSU may communicate with another RSU over the direct communications interface, and the like.

Figure 4:
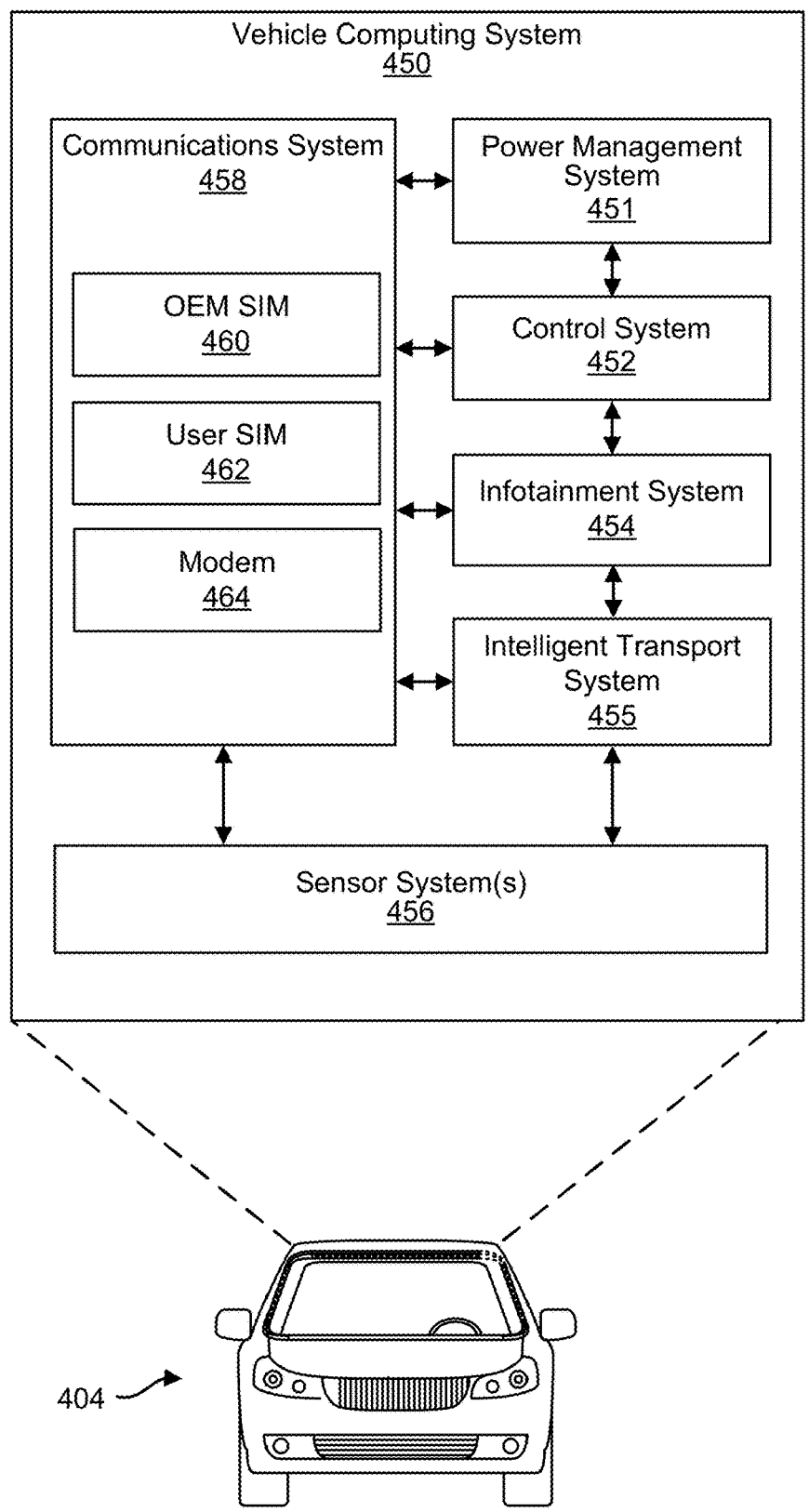
FIG. 4 is a block diagram illustrating an example of a computing system of a vehicle, according to aspects of the disclosure.

FIG. 4 is a block diagram illustrating an example vehicle computing system 450 of a vehicle 404. In some examples, the vehicle computing system 450 may be referred to as an on-board unit (OBU). The vehicle 404 is an example of a UE that may communicate with a network (e.g., an eNB, a gNB, a positioning beacon, a location measurement unit, and/or other network entity) over a Uu interface and with other UEs using V2X communications over a PC5 interface (or other device to device direct interface). As shown, the vehicle computing system 450 may include at least a power management system 451, a control system 452, an infotainment system 454, an intelligent transport system (ITS) 455, one or more sensor systems 456, and a communications system 458. In some cases, the vehicle computing system 450 may include or may be implemented using any type of processing device or system, such as one or more central processing units (CPUs), digital signal processors (DSPs), application specific integrated circuits (ASICs), field programmable gate arrays (FPGAs), application processors (APs), graphics processing units (GPUs), vision processing units (VPUs), Neural Network Signal Processors (NSPs), microcontrollers, dedicated hardware, any combination thereof, and/or other processing device or system.

The control system 452 may be configured to control one or more operations of the vehicle 404, the power management system 451, the computing system 450, the infotainment system 454, the ITS 455, and/or one or more other systems of the vehicle 404 (e.g., a braking system, a steering system, a safety system other than the ITS 455, a cabin system, and/or other system). In some examples, the control system 452 may include one or more electronic control units (ECUs). An ECU may control one or more of the electrical systems or subsystems in a vehicle. Examples of specific ECUs that may be included as part of the control system 452 include an engine control module (ECM), a powertrain control module (PCM), a transmission control module (TCM), a brake control module (BCM), a central control module (CCM), a central timing module (CTM), among others. In some cases, the control system 452 may receive sensor signals from the one or more sensor systems 456 and may communicate with other systems of the vehicle computing system 450 to operate the vehicle 404.

The vehicle computing system 450 also includes a power management system 451. In some implementations, the power management system 451 may include a power management integrated circuit (PMIC), a standby battery, and/or other components. In some cases, other systems of the vehicle computing system 450 may include one or more PMICs, batteries, and/or other components. The power management system 451 may perform power management functions for the vehicle 404, such as managing a power supply for the computing system 450 and/or other parts of the vehicle. For example, the power management system 451 may provide a stable power supply in view of power fluctuations, such as based on starting an engine of the vehicle. In another example, the power management system 451 may perform thermal monitoring operations, such as by checking ambient and/or transistor junction temperatures. In another example, the power management system 451 may perform certain functions based on detecting a certain temperature level, such as causing a cooling system (e.g., one or more fans, an air conditioning system, etc.) to cool certain components of the vehicle computing system 450 (e.g., the control system 452, such as one or more ECUs), shutting down certain functionalities of the vehicle computing system 450 (e.g., limiting the infotainment system 454, such as by shutting off one or more displays, disconnecting from a wireless network, etc.), among other functions.

The vehicle computing system 450 further includes a communications system 458. The communications system 458 may include both software and hardware components for transmitting signals to and receiving signals from a network (e.g., a gNB or other network entity over a Uu interface) and/or from other UEs (e.g., to another vehicle or UE over a PC5 interface, WiFi interface, Bluetooth™ interface, and/or other wireless and/or wired interface). For example, the communications system 458 is configured to transmit and receive information wirelessly over any suitable wireless network (e.g., a 3G network, 4G network, 5G network, WiFi network, Bluetooth™ network, and/or other network). The communications system 458 includes various components or devices used to perform the wireless communication functionalities, including an original equipment manufacturer (OEM) subscriber identity module (referred to as a SIM or SIM card) 460, a user SIM 462, and a modem 464. While the vehicle computing system 450 is shown as having two SIMs and one modem, the computing system 450 may have any number of SIMs (e.g., one SIM or more than two SIMs) and any number of modems (e.g., one modem, two modems, or more than two modems) in some implementations.

A SIM is a device (e.g., an integrated circuit) that may securely store an international mobile subscriber identity (IMSI) number and a related key (e.g., an encryption-decryption key) of a particular subscriber or user. The IMSI and key may be used to identify and authenticate the subscriber on a particular UE. The OEM SIM 460 may be used by the communications system 458 for establishing a wireless connection for vehicle-based operations, such as for conducting emergency-calling (eCall) functions, communicating with a communications system of the vehicle manufacturer (e.g., for software updates, etc.), among other operations. The OEM SIM 460 may be used to support one or more services such as eCall for making emergency calls in the event of a car accident or other emergency. For instance, eCall may include a service that automatically dials an emergency number (e.g., "9-1-1" in the United States, "1-1-2" in Europe, etc.) in the event of a vehicle accident and communicates a location of the vehicle to the emergency services, such as a police department, fire department, etc.

The user SIM 462 may be used by the communications system 458 for performing wireless network access functions in order to support a user data connection (e.g., for conducting phone calls, messaging, Infotainment related services, among others). In some cases, a user device of a user may connect with the vehicle computing system 450 over an interface (e.g., over PC5, Bluetooth™, WiFI™, a universal serial bus (USB) port, and/or other wireless or wired interface). Once connected, the user device may transfer wireless network access functionality from the user device to communications system 458 the vehicle, in which case the user device may cease performance of the wireless network access functionality (e.g., during the period in which the communications system 458 is performing the wireless access functionality). The communications system 458 may begin interacting with a base station to perform one or more wireless communication operations, such as facilitating a phone call, transmitting and/or receiving data (e.g., messaging, video, audio, etc.), among other operations. In such cases, other components of the vehicle computing system 450 may be used to output data received by the communications system 458. For example, the infotainment system 454 (described below) may display video received by the communications system 458 on one or more displays and/or may output audio received by the communications system 458 using one or more speakers.

A modem is a device that modulates one or more carrier wave signals to encode digital information for transmission, and demodulates signals to decode the transmitted information. The modem 464 (and/or one or more other modems of the communications system 458) may be used for communication of data for the OEM SIM 460 and/or the user SIM 462. In some examples, the modem 464 may include a 4G (or LTE) modem and another modem (not shown) of the communications system 458 may include a 5G (or NR) modem. In some examples, the communications system 458 may include one or more Bluetooth™ modems (e.g., for Bluetooth™ Low Energy (BLE) or other type of Bluetooth communications), one or more WiFi™ modems (e.g., for DSRC communications and/or other WiFi communications), wideband modems (e.g., an ultra-wideband (UWB) modem), any combination thereof, and/or other types of modems.

In some cases, the modem 464 (and/or one or more other modems of the communications system 458) may be used for performing V2X communications (e.g., with other vehicles for V2V communications, with other devices for D2D communications, with infrastructure systems for V2I communications, with pedestrian UEs for V2P communications, etc.). In some examples, the communications system 458 may include a V2X modem used for performing V2X communications (e.g., sidelink communications over a PC5 interface), in which case the V2X modem may be separate from one or more modems used for wireless network access functions (e.g., for network communications over a network/Uu interface and/or sidelink communications other than V2X communications).

In some examples, the communications system 458 may be or may include a telematics control unit (TCU). In some implementations, the TCU may include a network access device (NAD) (also referred to in some cases as a network control unit or NCU). The NAD may include the modem 464, any other modem not shown in FIG. 4, the OEM SIM 460, the user SIM 462, and/or other components used for wireless communications. In some examples, the communications system 458 may include a Global Navigation Satellite System (GNSS). In some cases, the GNSS may be part of the one or more sensor systems 456, as described below. The GNSS may provide the ability for the vehicle computing system 450 to perform one or more location services, navigation services, and/or other services that may utilize GNSS functionality.

In some cases, the communications system 458 may further include one or more wireless interfaces (e.g., including one or more transceivers and one or more baseband processors for each wireless interface) for transmitting and receiving wireless communications, one or more wired interfaces (e.g., a serial interface such as a universal serial bus (USB) input, a lightening connector, and/or other wired interface) for performing communications over one or more hardwired connections, and/or other components that may allow the vehicle 404 to communicate with a network and/or other UEs.

The vehicle computing system 450 may also include an infotainment system 454 that may control content and one or more output devices of the vehicle 404 that may be used to output the content. The infotainment system 454 may also be referred to as an in-vehicle infotainment (IVI) system or an In-car entertainment (ICE) system. The content may include navigation content, media content (e.g., video content, music or other audio content, and/or other media content), among other content. The one or more output devices may include one or more graphical user interfaces, one or more displays, one or more speakers, one or more extended reality devices (e.g., a VR, AR, and/or MR headset), one or more haptic feedback devices (e.g., one or more devices configured to vibrate a seat, steering wheel, and/or other part of the vehicle 404), and/or other output device.

In some examples, the computing system 450 may include the intelligent transport system (ITS) 455. In some examples, the ITS 455 may be used for implementing V2X communications. For example, an ITS stack of the ITS 455 may generate V2X messages based on information from an application layer of the ITS. In some cases, the application layer may determine whether certain conditions have been met for generating messages for use by the ITS 455 and/or for generating messages that are to be sent to other vehicles (for V2V communications), to pedestrian UEs (for V2P communications), and/or to infrastructure systems (for V2I communications). In some cases, the communications system 458 and/or the ITS 455 may obtain car access network (CAN) information (e.g., from other components of the vehicle via a CAN bus). In some examples, the communications system 458 (e.g., a TCU NAD) may obtain the CAN information via the CAN bus and may send the CAN information to the ITS stack. The CAN information may include vehicle related information, such as a heading of the vehicle, speed of the vehicle, breaking information, among other information. The CAN information may be continuously or periodically (e.g., every 1 millisecond (ms), every 10 ms, or the like) provided to the ITS 455.

The conditions used to determine whether to generate messages may be determined using the CAN information based on safety-related applications and/or other applications, including applications related to road safety, traffic efficiency, infotainment, business, and/or other applications. In one illustrative example, ITS 455 may perform lane change assistance or negotiation. For instance, using the CAN information, the ITS 455 may determine that a driver of the vehicle 404 is attempting to change lanes from a current lane to an adjacent lane (e.g., based on a blinker being activated, based on the user veering or steering into an adjacent lane, etc.). Based on determining the vehicle 404 is attempting to change lanes, the ITS 455 may determine a lane-change condition has been met that is associated with a message to be sent to other vehicles that are nearby the vehicle in the adjacent lane. The ITS 455 may trigger the ITS stack to generate one or more messages for transmission to the other vehicles, which may be used to negotiate a lane change with the other vehicles. Other examples of applications include forward collision warning, automatic emergency breaking, lane departure warning, pedestrian avoidance or protection (e.g., when a pedestrian is detected near the vehicle 404, such as based on V2P communications with a UE of the user), traffic sign recognition, among others.

The ITS 455 may use any suitable protocol to generate messages (e.g., V2X messages). Examples of protocols that may be used by the ITS 455 include one or more Society of Automotive Engineering (SAE) standards, such as SAE J2735, SAE J2945, SAE J3161, and/or other standards, which are hereby incorporated by reference in their entirety and for all purposes.

A security layer of the ITS 455 may be used to securely sign messages from the ITS stack that are sent to and verified by other UEs configured for V2X communications, such as other vehicles, pedestrian UEs, and/or infrastructure systems. The security layer may also verify messages received from such other UEs. In some implementations, the signing and verification processes may be based on a security context of the vehicle. In some examples, the security context may include one or more encryption-decryption algorithms, a public and/or private key used to generate a signature using an encryption-decryption algorithm, and/or other information. For example, each ITS message generated by the ITS stack may be signed by the security layer. The signature may be derived using a public key and an encryption-decryption algorithm. A vehicle, pedestrian UE, and/or infrastructure system receiving a signed message may verify the signature to make sure the message is from an authorized vehicle. In some examples, the one or more encryption-decryption algorithms may include one or more symmetric encryption algorithms (e.g., advanced encryption standard (AES), data encryption standard (DES), and/or other symmetric encryption algorithm), one or more asymmetric encryption algorithms using public and private keys (e.g., Rivest-Shamir-Adleman (RSA) and/or other asymmetric encryption algorithm), and/or other encryption-decryption algorithm.

In some examples, the ITS 455 may determine certain operations (e.g., V2X-based operations) to perform based on messages received from other UEs. The operations may include safety-related and/or other operations, such as operations for road safety, traffic efficiency, infotainment, business, and/or other applications. In some examples, the operations may include causing the vehicle (e.g., the control system 452) to perform automatic functions, such as automatic breaking, automatic steering (e.g., to maintain a heading in a particular lane), automatic lane change negotiation with other vehicles, among other automatic functions. In one illustrative example, a message may be received by the communications system 458 from another vehicle (e.g., over a PC5 interface) indicating that the other vehicle is coming to a sudden stop. In response to receiving the message, the ITS 455 may generate a message or instruction and may send the message or instruction to the control system 452, which may cause the control system 452 to automatically break the vehicle 404 so that it comes to a stop before making impact with the other vehicle. In other illustrative examples, the operations may include triggering display of a message alerting a driver that another vehicle is in the lane next to the vehicle, a message alerting the driver to stop the vehicle, a message alerting the driver that a pedestrian is in an upcoming cross-walk, a message alerting the driver that a toll booth is within a certain distance (e.g., within 1 mile) of the vehicle, among others.

The computing system 450 further includes one or more sensor systems 456 (e.g., a first sensor system through an Nth sensor system, where N is a value equal to or greater than 0). When including multiple sensor systems, the sensor system(s) 456 may include different types of sensor systems that may be arranged on or in different parts the vehicle 404. The sensor system(s) 456 may include one or more camera sensor systems, Light Detection and Ranging (LIDAR) sensor systems, radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems (e.g., one or more Global Positioning System (GPS) receiver systems), accelerometers, gyroscopes, inertial measurement units (IMUs), infrared sensor systems, laser rangefinder systems, ultrasonic sensor systems, infrasonic sensor systems, microphones, any combination thereof, and/or other sensor systems. It should be understood that any number of sensors or sensor systems may be included as part of the computing system 450 of the vehicle 404.

While the vehicle computing system 450 is shown to include certain components and/or systems, one of ordinary skill will appreciate that the vehicle computing system 450 may include more or fewer components than those shown in FIG. 4. For example, the vehicle computing system 450 may also include one or more input devices and one or more output devices (not shown). In some implementations, the vehicle computing system 450 may also include (e.g., as part of or separate from the control system 452, the infotainment system 454, the communications system 458, and/or the sensor system(s) 456) at least one processor and at least one memory having computer-executable instructions that are executed by the at least one processor. The at least one processor is in communication with and/or electrically connected to (referred to as being "coupled to" or "communicatively coupled") the at least one memory. The at least one processor may include, for example, one or more microcontrollers, one or more central processing units (CPUs), one or more field programmable gate arrays (FPGAs), one or more graphics processing units (GPUs), one or more application processors (e.g., for running or executing one or more software applications), and/or other processors. The at least one memory may include, for example, read-only memory (ROM), random access memory (RAM) (e.g., static RAM (SRAM)), electrically erasable programmable read-only memory (EEPROM), flash memory, one or more buffers, one or more databases, and/or other memory. The computer-executable instructions stored in or on the at least memory may be executed to perform one or more of the functions or operations described herein.

Figure 5:
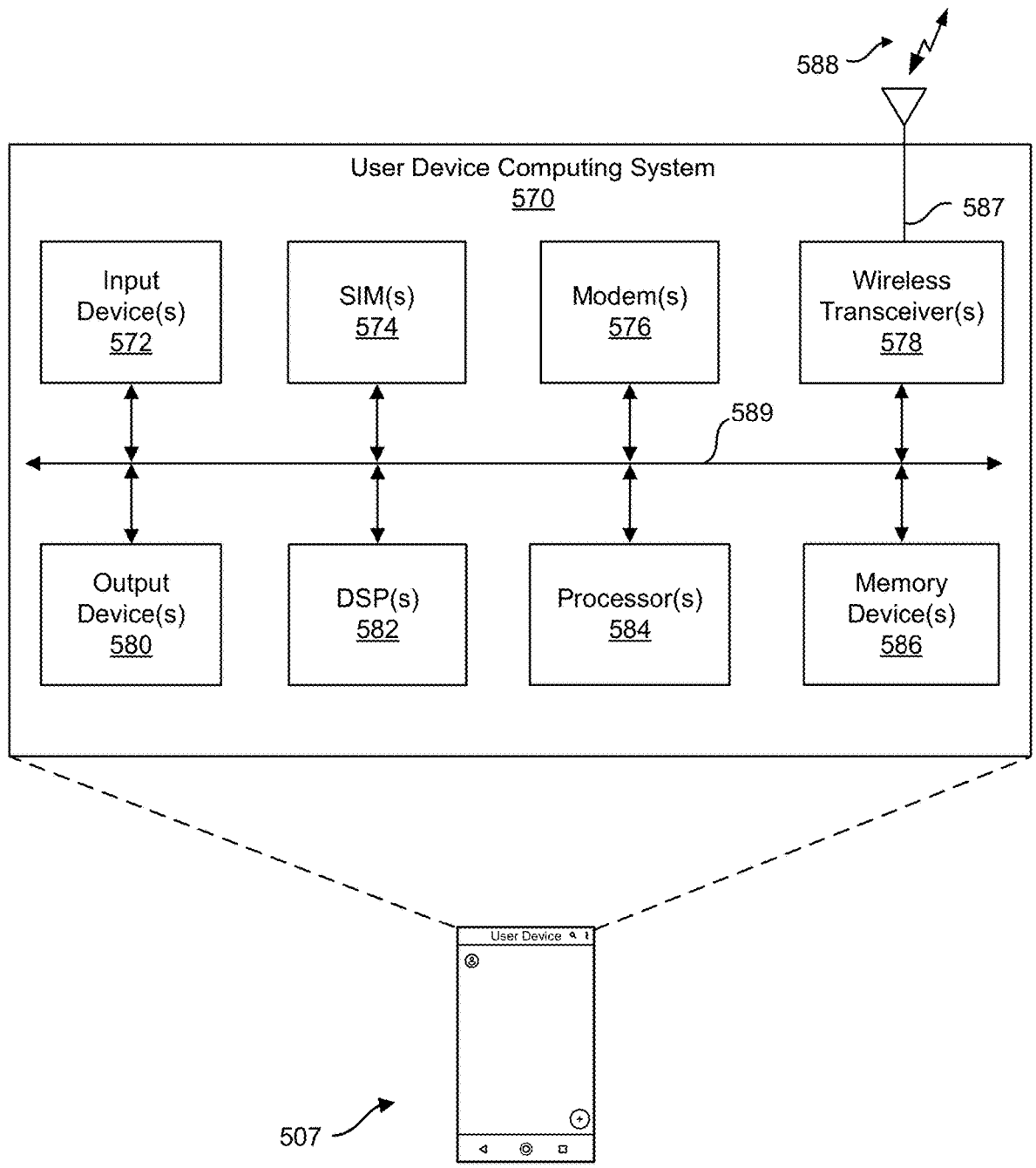
FIG. 5 is a block diagram illustrating an example of a computing system of a user device, according to aspects of the disclosure.

FIG. 5 illustrates an example of a computing system 570 of a wireless device 507. The wireless device 507 may include a client device such as a UE (e.g., UE 104, UE 152, UE 190) or other type of device (e.g., a station (STA) configured to communication using a Wi-Fi interface) that may be used by an end-user. Wireless device may also include network devices (e.g., base stations such as eNBs and/or gNBs, Wi-Fi access points (APs) such as routers, range extenders or the like, etc.). For example, the wireless device 507 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, base station, access point, and/or another device that is configured to communicate over a wireless communications network. The computing system 570 includes software and hardware components that may be electrically or communicatively coupled via a bus 589 (or may otherwise be in communication, as appropriate). For example, the computing system 570 includes one or more processors 584. The one or more processors 584 may include one or more CPUs, ASICs, FPGAs, APs, GPUs, VPUs, NSPs, microcontrollers, dedicated hardware, any combination thereof, and/or other processing device or system. The bus 589 may be used by the one or more processors 584 to communicate between cores and/or with the one or more memory devices 586.

The computing system 570 may also include one or more memory devices 586, one or more digital signal processors (DSPs) 582, one or more SIMs 574, one or more modems 576, one or more wireless transceivers 578, an antenna 587, one or more input devices 572 (e.g., a camera, a mouse, a keyboard, a touch sensitive screen, a touch pad, a keypad, a microphone, and/or the like), and one or more output devices 580 (e.g., a display, a speaker, a printer, and/or the like).

In some aspects, computing system 570 may include one or more radio frequency (RF) interfaces configured to transmit and/or receive RF signals. In some examples, an RF interface may include components such as modem(s) 576, wireless transceiver(s) 578, and/or antennas 587. The one or more wireless transceivers 578 may transmit and receive wireless signals (e.g., signal 588) via antenna 587 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 570 may include multiple antennas or an antenna array that may facilitate simultaneous transmit and receive functionality. Antenna 587 may be an omnidirectional antenna such that radio frequency (RF) signals may be received from and transmitted in all directions. The wireless signal 588 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 588 may be transmitted directly to other wireless devices using sidelink communications (e.g., using a PC5 interface, using a DSRC interface, etc.). Wireless transceivers 578 may be configured to transmit RF signals for performing sidelink communications via antenna 587 in accordance with one or more transmit power parameters that may be associated with one or more regulation modes. Wireless transceivers 578 may also be configured to receive sidelink communication signals having different signal parameters from other wireless devices.

In some examples, the one or more wireless transceivers 578 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 588 into a baseband or intermediate frequency and may convert the RF signals to the digital domain.

In some cases, the computing system 570 may include a coding-decoding device (or CODEC) configured to encode and/or decode data transmitted and/or received using the one or more wireless transceivers 578. In some cases, the computing system 570 may include an encryption-decryption device or component configured to encrypt and/or decrypt data (e.g., according to the AES and/or DES standard) transmitted and/or received by the one or more wireless transceivers 578.

The one or more SIMs 574 may each securely store an international mobile subscriber identity (IMSI) number and related key assigned to the user of the wireless device 507. The IMSI and key may be used to identify and authenticate the subscriber when accessing a network provided by a network service provider or operator associated with the one or more SIMs 574. The one or more modems 576 may modulate one or more signals to encode information for transmission using the one or more wireless transceivers 578. The one or more modems 576 may also demodulate signals received by the one or more wireless transceivers 578 in order to decode the transmitted information. In some examples, the one or more modems 576 may include a Wi-Fi modem, a 4G (or LTE) modem, a 5G (or NR) modem, and/or other types of modems. The one or more modems 576 and the one or more wireless transceivers 578 may be used for communicating data for the one or more SIMs 574.

The computing system 570 may also include (and/or be in communication with) one or more non-transitory machine-readable storage media or storage devices (e.g., one or more memory devices 586), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 586 and executed by the one or more processor(s) 584 and/or the one or more DSPs 582. The computing system 570 may also include software elements (e.g., located within the one or more memory devices 586), including, for example, an operating system, device drivers, executable libraries, and/or other code, such as one or more application programs, which may comprise computer programs implementing the functions provided by various embodiments, and/or may be designed to implement methods and/or configure systems, as described herein.

In some aspects, the wireless device 507 may include means for performing operations described herein. The means may include one or more of the components of the computing system 570. For example, the means for performing operations described herein may include one or more of input device(s) 572, SIM(s) 574, modems(s) 576, wireless transceiver(s) 578, output device(s) (580), DSP(s) 582, processors (584), memory device(s) 586, and/or antenna(s) 587.

In some aspects, wireless device 507 may correspond to a user equipment (UE) and may include: means for identifying, by a user equipment (UE), a plurality of sidelink positioning anchor devices; and means for associating the UE with one or more sidelink positioning anchor devices from the plurality of sidelink positioning anchor devices based on one or more parameters associated with each of the plurality of sidelink positioning anchor devices. In some examples, the means for identifying may include the one or more processors 584, the one or more DSPs 582, the one or more wireless transceivers 578, the one or more modems 576, the one or more memory devices 586, any combination thereof, or other component(s) of the wireless device. In some aspects, the means for associating may include the one or more processors 584, the one or more DSPs 582, the one or more wireless transceivers 578, the one or more modems 576, the one or more memory devices 586, any combination thereof, or other component(s) of the wireless device.

In some examples, wireless device 507 may correspond to a sidelink positioning anchor device and may include: means for receiving a positioning query message from a user equipment (UE); means for determining at least one measurement associated with the UE in response to the positioning query message; and means for sending the at least one measurement to the UE. In some examples, the means for receiving may include the one or more wireless transceivers 578, the one or more modems 576, the one or more SIMs 574, the one or more processors 584, the one or more DSPs 582, the one or more memory devices 586, any combination thereof, or other component(s) of the wireless device. In some aspects, the means for determining may include the one or more processors 584, the one or more DSPs 582, the one or more wireless transceivers 578, the one or more modems 576, the one or more memory devices 586, any combination thereof, or other component(s) of the wireless device. In some cases, the means for sending may include the one or more wireless transceivers 578, the one or more modems 576, the one or more SIMs 574, the one or more processors 584, the one or more DSPs 582, the one or more memory devices 586, any combination thereof, or other component(s) of the wireless device.

In some aspects, wireless device 507 may correspond to a network entity (e.g., an eNB, a gNB, etc.) and may include: means for receiving, from a user equipment (UE), one or more parameters corresponding to a plurality of sidelink positioning anchor devices; means for selecting, based on the one or more parameters, a subset of sidelink positioning anchor devices from the plurality of sidelink positioning anchor devices, wherein the subset of sidelink positioning anchor devices are associated with the UE for sidelink positioning; and means for transmitting an indication of the subset of sidelink positioning anchor devices to the UE. In some examples, the means for receiving may include the one or more wireless transceivers 578, the one or more modems 576, the one or more SIMs 574, the one or more processors 584, the one or more DSPs 582, the one or more memory devices 586, any combination thereof, or other component(s) of the wireless device. In some cases, the means for selecting may include the one or more processors 584, the one or more DSPs 582, the one or more wireless transceivers 578, the one or more modems 576, the one or more memory devices 586, any combination thereof, or other component(s) of the wireless device. In some cases, the means for transmitting may include the one or more wireless transceivers 578, the one or more modems 576, the one or more SIMs 574, the one or more processors 584, the one or more DSPs 582, the one or more memory devices 586, any combination thereof, or other component(s) of the wireless device.

Figure 6:
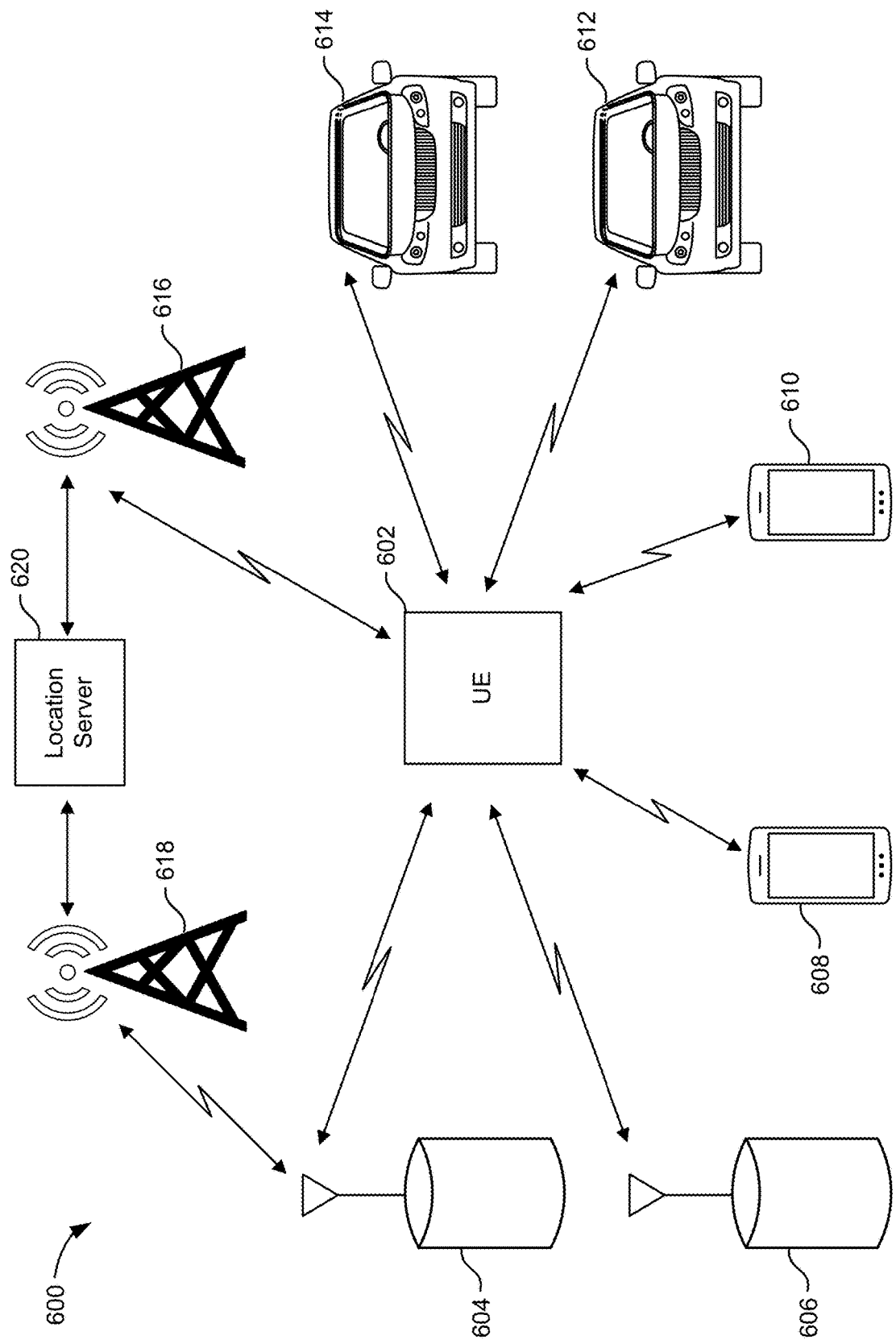
FIG. 6 is a diagram illustrating an example wireless communications system for implementing anchor association for sidelink positioning, according to aspects of the disclosure.

As noted previously, systems and techniques are described herein for performing anchor association for sidelink positioning. FIG. 6 is a diagram illustrating an example wireless communications system 600 for implementing anchor association for sidelink positioning. In some aspects, the system 600 may include a target user equipment (UE) device such as UE 602. As noted above, UE 602 may include any wireless communication device (e.g., a mobile phone, router, tablet computer, laptop computer, tracking device, wearable device (e.g., smart watch, glasses, an extended reality (XR) device such as a virtual reality (VR) headset, an augmented reality (AR) headset or glasses, or a mixed reality (MR) headset, etc.), vehicle (e.g., automobile, motorcycle, bicycle, etc.), Internet of Things (IoT) device, etc.) used by a user to communicate over a wireless communications network.

In some examples, system 600 may include one or more additional user equipment devices. For instance, system 600 may include one or more road side units (e.g., RSU 604, RSU 606), one or more pedestrian UE devices (e.g., pedestrian UE 608, pedestrian UE 610), and one or more vehicles (e.g., vehicle 612, vehicle 614). In some configurations, UE 602 may communicate with one or more of RSU 604, RSU 606, pedestrian UE 608, pedestrian UE 610, vehicle 612, and/or vehicle 614 using sidelink communications (e.g., PC5, DSRC, etc.). In some configurations, system 600 may also include a base station 616 that may be associated with UE 602 (e.g., UE 602 may communicate with base station 616 using a network (Uu) interface). In some cases, system 600 may also include base station 618 that may be associated with RSU 604. In some aspects, system 600 may include a location server 620 that may be coupled to base station 616 and/or base station 618.

In some aspects, one or more of RSU 604, RSU 606, pedestrian UE 608, pedestrian UE 610, vehicle 612, and/or vehicle 614 may be configured as a sidelink positioning anchor device (e.g., a UE having a known position). In some cases, UE 602 may use sidelink communications to associate with one or more sidelink positioning anchor devices (e.g., RSU 604, RSU 606, pedestrian UE 608, pedestrian UE 610, vehicle 612, and/or vehicle 614) in order to implement one or more sidelink positioning algorithms (e.g., determine an absolute position or a relative position corresponding to UE 602). In one illustrative example, UE 602 may determine its absolute position and/or its relative position by obtaining location data associated with one or more sidelink positioning anchor devices (e.g., RSU 604, RSU 606, pedestrian UE 608, pedestrian UE 610, vehicle 612, and/or vehicle 614).

In some examples, UE 602 may determine a number of sidelink positioning anchor devices that are needed for performing sidelink positioning (e.g., to determine an absolute position) and/or for performing sidelink ranging (e.g., to determine a relative position). In one illustrative example, UE 602 may determine that three sidelink positioning anchor devices are needed to perform sidelink positioning that is based on multilateration (e.g., based on time difference of arrival (TDoA) of signals).

In some cases, UE 602 may determine that sidelink positioning may be performed using one or two sidelink positioning anchor devices. In another illustrative example, UE 602 may correspond to a vehicle that may obtain multiple measurements of a positioning signal from a single sidelink positioning anchor device while the vehicle is in motion. In some aspects, the vehicle (e.g., UE 602) may include one or more sensors (e.g., sensor system 456) that may be used to obtain measurements or data related to distance, speed, orientation, and/or any other type of measurement that may be obtained using sensor system 456. In some examples, data from sensors (e.g., sensor system 456) may be used by UE 602 to determine the distance traveled between measurements of a positioning signal from a sidelink positioning anchor device (e.g., RSU 604, RSU 606, pedestrian UE 608, pedestrian UE 610, vehicle 612, and/or vehicle 614) in order to determine an absolute position of UE 602 using one or more sidelink positioning anchor devices. Those skilled in the art will understand that the number of sidelink positioning anchor devices set forth herein are provided as example configurations and that the disclosed systems and techniques are not limited thereto.

In some aspects, UE 602 may determine that the number of available sidelink positioning anchor devices is greater than the number of sidelink positioning anchor devices needed (e.g., desired, required, wanted, etc.) for performing sidelink positioning. For example, UE 602 may determine that the six sidelink positioning anchor devices present in system 600 (e.g., RSU 604, RSU 606, pedestrian UE 608, pedestrian UE 610, vehicle 612, and vehicle 614 are present in system 600) exceed the number of sidelink positioning anchor devices needed to determine an absolute position and/or a relative position of UE 602. In some aspects, UE 608 may associate with a portion of the available sidelink positioning anchor devices in order to perform sidelink positioning.

In some cases, a determination to associate UE 602 with one or more of the available sidelink positioning anchor devices may be based on one or more parameters associated with each of the sidelink positioning anchor devices. In some aspects, the one or more parameters may include a power measurement or parameter (e.g., a reference signal received power (RSRP)) between UE 602 and a respective sidelink positioning anchor device. In some cases, the RSRP may be measured by UE 602 based on a signal transmission from a sidelink positioning anchor device (e.g., RSU 604, RSU 606, pedestrian UE 608, pedestrian UE 610, vehicle 612, and vehicle 614).

In some aspects, the RSRP may be measured by a respective sidelink positioning anchor device (e.g., RSU 604, RSU 606, pedestrian UE 608, pedestrian UE 610, vehicle 612, and vehicle 614) based on a signal transmission from UE 602. In some cases, UE 602 may transmit a positioning query message to one or more of the sidelink positioning anchor devices. In some examples, a respective sidelink positioning anchor device may perform RSRP measurements in response to the positioning query message from UE 602. In some configuration, both the UE 602 and the respective sidelink positioning anchor device may obtain RSRP measurements. In some cases, the signal transmission may correspond to a Physical Sidelink Shared Channel (PSSCH) transmission, a Channel State Information Reference Signal (CSI-RS) transmission, a Sounding Reference Signal (SRS) transmission, a Positioning Reference Signal (PRS) transmission, any other signal transmission, and/or any combination thereof.

In some aspects, UE 602 may associate with one or more sidelink positioning anchor devices based on the RSRP measurements. For instance, UE 602 may sort each of RSU 604, RSU 606, pedestrian UE 608, pedestrian UE 610, vehicle 612, and vehicle 614 based on corresponding RSRP measurements (e.g., measured by UE 602, by a respective sidelink positioning anchor device, or a combination thereof). In some cases, UE 602 may be associated with "N" number of sidelink positioning anchor devices needed to implement the positioning algorithm based on the "N" highest RSRP measurements.

In some aspects, UE 602 may associate with one or more sidelink positioning anchor devices based on an RSRP measurement threshold value. In one illustrative example, the RSRP measurement threshold value may correspond to a received power level that is greater than or equal to −60 dBm. Any other suitable RSRP measurement threshold value may be used. In some cases, UE 602 may randomly select "N" number of sidelink positioning anchor devices (e.g., "N" number needed to implement positioning algorithm) that are associated with an RSRP measurement that is greater than or equal to the RSRP measurement threshold. In some cases, UE 602 may select "N" number of sidelink positioning anchor devices by sorting the RSRP measurement that satisfy the RSRP measurement threshold. For instance, UE 602 may associate with the sidelink positioning anchor devices having the highest RSRP measurements that also satisfy the RSRP measurement threshold.

In some cases, the one or more parameters used to determine an association between UE 602 and the sidelink positioning anchor devices may include a distance between UE 602 and a respective sidelink positioning anchor device. In some examples, the sidelink positioning anchor devices (e.g., RSU 604, RSU 606, pedestrian UE 608, pedestrian UE 610, vehicle 612, and vehicle 614) may transmit a message to UE 602 that includes location information associated with the respective sidelink positioning anchor device. In some aspects, the location information may include geographic coordinates (e.g., a geolocation) and/or a zone identifier. In some configurations, UE 602 may use the location information received from a respective sidelink positioning anchor device to determine a distance between UE 602 and the sidelink positioning anchor device. For example, UE 602 may use a current position to determine the distance between UE 602 and the respective sidelink positioning anchor device. In some cases, UE 602 may obtain its current position based on a Global Navigation Satellite System (GNSS) signal, location history, and/or Uu positioning (e.g., provided by base station 616). In some aspects, UE 602 may implement sidelink positioning to determine a position having a higher degree of precision or accuracy than its current position.

In some aspects, one or more of the sidelink positioning anchor devices (e.g., RSU 604, RSU 606, pedestrian UE 608, pedestrian UE 610, vehicle 612, and vehicle 614) may determine the distance between the respective sidelink positioning anchor device and UE 602. In some examples, UE 602 may transmit a message to the sidelink positioning anchor devices that includes its current position (e.g., based on GNSS signal, location history, and/or Uu positioning). In some cases, the respective sidelink positioning anchor device may use the current position received from UE 602 to determine the distance between the respective sidelink positioning anchor device and UE 602.

In some examples, the one or more parameters may include a distance measurement. For example, UE 602 may associate with one or more sidelink positioning anchor devices based on the distance measurements (in addition to or as an alternative to using the power measurement/parameter and/or other parameter described herein). For instance, UE 602 may sort each of RSU 604, RSU 606, pedestrian UE 608, pedestrian UE 610, vehicle 612, and vehicle 614 based on corresponding distance measurements (e.g., measured by UE 602, by a respective sidelink positioning anchor device, or a combination thereof). In some cases, UE 602 may be associated with "N" number of sidelink positioning anchor devices needed to implement the positioning algorithm based on the "N" nearest sidelink positioning anchor devices.

In some aspects, UE 602 may associate with one or more sidelink positioning anchor devices based on a distance measurement threshold. In one illustrative example, the distance measurement threshold may correspond to a distance that is less than or equal to 80 meters. In some cases, UE 602 may randomly select "N" number of sidelink positioning anchor devices (e.g., "N" number needed to implement positioning algorithm) that are associated with a distance measurement that is less than or equal to the distance measurement threshold. In some cases, UE 602 may select "N" number of sidelink positioning anchor devices by sorting the distance measurements that satisfy the distance measurement threshold. For instance, UE 602 may associate with the sidelink positioning anchor devices having the lowest distance measurements that also satisfy the distance measurement threshold.

In some cases, the one or more parameters used to determine an association between UE 602 and the sidelink positioning anchor devices may include a line-of-sight (LOS) or a non-line-of-sign (NLOS) determination between UE 602 and a respective sidelink positioning anchor device. In some aspects, a LOS determination may correspond to a signal that is propagated directly between UE 602 and a sidelink positioning anchor device. In some examples, a NLOS determination may correspond to a signal that is reflected, diffracted, and/or otherwise altered because of one or more obstructions.

In some examples, UE 602 may determine whether a channel that is associated with a respective sidelink positioning anchor device is LOS or NLOS (in addition to or as an alternative to using the power measurement, the distance measurement, and/or other parameter described herein). In some aspects, one or more of the sidelink positioning anchor devices (e.g., RSU 604, RSU 606, pedestrian UE 608, pedestrian UE 610, vehicle 612, and vehicle 614) may determine whether a channel that is associated with UE 602 is LOS or NLOS. In some cases, the LOS/NLOS determination may be made based on a measurement from a signal that is transmitted by UE 602. In some aspects, the LOS/NLOS determination may be made based on a measurement from a signal that is transmitted by a respective sidelink positioning anchor device. In some configurations, the LOS/NLOS determination may be made based on one or more other inputs or signals (e.g., an application layer indication).

In some cases, the sidelink positioning anchor devices having LOS to UE 602 may be prioritized for association. In some aspects, UE 602 may randomly select one or more sidelink positioning anchor devices for association from the sidelink positioning anchor devices having LOS to UE 602. In some examples, the LOS determination may be used together with the RSRP measurement and/or the distance measurement to select sidelink positioning anchor devices for association. For instance, UE 602 may select "N" number of sidelink positioning anchor devices having LOS based on the highest RSRP. In another example, UE 602 may select "N" number of sidelink positioning anchor devices having LOS based on the shortest distance. In some aspects, one or more sidelink positioning anchor devices having NLOS to UE 602 may also be selected for association based on parameters such as distance and/or RSRP.

In some aspects, the one or more parameters used to determine an association between UE 602 and the sidelink positioning anchor devices may include anchor device capabilities associated with a respective sidelink positioning anchor device. In some aspects, sidelink positioning anchor devices may transmit one or more sidelink messages that include an indication of anchor device capabilities. In some examples, anchor device capabilities may include a number of receiving antennas (e.g., 2, 4, 6, 8, etc.); a maximum transmission bandwidth (e.g., 40 MHz, 60 MHz, 100 MHz, etc.); a maximum number of component carriers (e.g., 1 CC;

carrier aggregation (CA) of 4 CCs; etc.); a transmission power class (e.g., 20 dBm; 23 dBm; etc.); and/or any combination thereof.

In some examples, UE 602 may associate with one or more sidelink positioning anchor devices based on the anchor device capabilities (in addition to or as an alternative to using the power measurement, the distance measurement, the LOS or NLOS measurements, and/or other parameter described herein). In one illustrative example, UE 602 may prioritize association with one or more sidelink positioning anchor devices having a higher bandwidth and/or a greater number of component carriers in order to achieve a higher level of positioning accuracy. In another example, UE 602 may prioritize association with one or more sidelink positioning anchor devices having a greater number of receiving antennas in order to improve angle-of-arrival measurements. In some instances, UE 602 may associated with one or more sidelink positioning anchor devices based on the highest transmission power. In some aspects, UE 602 may select one or more sidelink positioning anchor devices for association based on anchor device capabilities as well as any other parameters (e.g., RSRP, Distance, LOS/NLOS, etc.).

In some cases, the one or more parameters used to determine an association between UE 602 and the sidelink positioning anchor devices may include an anchor device category. In some aspects, anchor categories may include a road side unit (RSU) category (e.g., RSU 604, RSU 606), a vehicle on-board unit (OBU) category (e.g., vehicle 612, vehicle 614), and/or a pedestrian UE category (e.g., UE 608, UE 610). In some cases, sidelink anchor positioning devices may transmit sidelink messages indicating an anchor device category. In some examples, UE 602 may associate with one or more sidelink positioning anchor devices based the anchor category (in addition to or as an alternative to using the power measurement, the distance measurement, the LOS or NLOS measurements, the anchor device capability information, and/or other parameter described herein). In one illustrative example, UE 602 may prioritize association with RSU 604 over pedestrian UE 608. In some aspects, UE 602 may select one or more sidelink positioning anchor devices for association based on an anchor device category as well as any other parameters (e.g., RSRP, Distance, LOS/NLOS, anchor device capabilities, etc.).

In some examples, system 600 may be configured to perform network based anchor association for sidelink positioning. In some aspects, UE 602 may send a measurement report to base station 616 that may be used to select one or more sidelink positioning anchor devices for association with UE 602. In some cases, the measurement report may include one or more of the parameters associated with each of the sidelink positioning anchor devices. As noted above, the one or more parameters may include a power measurement/parameter (e.g., a reference signal received power (RSRP)) between UE 602 and a respective sidelink positioning anchor device; a distance between UE 602 and a respective sidelink positioning anchor device; a line-of-sight (LOS) or a non-line-of-sign (NLOS) determination between UE 602 and a respective sidelink positioning anchor device; one or more anchor device capabilities associated with a respective sidelink positioning anchor device; an anchor device category; and/or any combination thereof. In some examples, the measurement report may also include an identifier associated with the sidelink positioning anchor device (e.g., Radio Network Temporary Identifier (RNTI); V2X layer 2 identifier; identifier used for sidelink positioning; etc.). In some cases, the measurement report may also include an identifier associated with UE 602 (e.g., V2X layer 2 identifier; application identifier; etc.). In some examples, the measurement report may also include one or more timestamps that may indicate a time when a corresponding measurement was performed. In some cases, the measurement report may be sent to the network (e.g., from UE 602 to base station 616) using the Radio Resource Control (RRC) layer. In some instances, the measurement report may be sent using Non-Access-Stratum (NAS) signaling. Any other signaling can be used to transmit the measurement report to the network.

In some aspects, one or more of the sidelink positioning anchor devices (e.g., RSU 604, RSU 606, pedestrian UE 608, pedestrian UE 610, vehicle 612, and vehicle 614) may send a measurement report a network device. For example, RSU 604 may send a measurement report to base station 618. In some cases, base station 616 and/or base station 618 may use the measurement reports to determine an association between UE 602 and one or more of the sidelink positioning anchor devices. In some examples, base station 616 and/or base station 618 may send the measurement reports to location server 620 (e.g., configured to implement LMF 270). In some aspects, location server 620 may use the measurement reports to determine an association between UE 602 and one or more of the sidelink positioning anchor devices.

Figure 7:
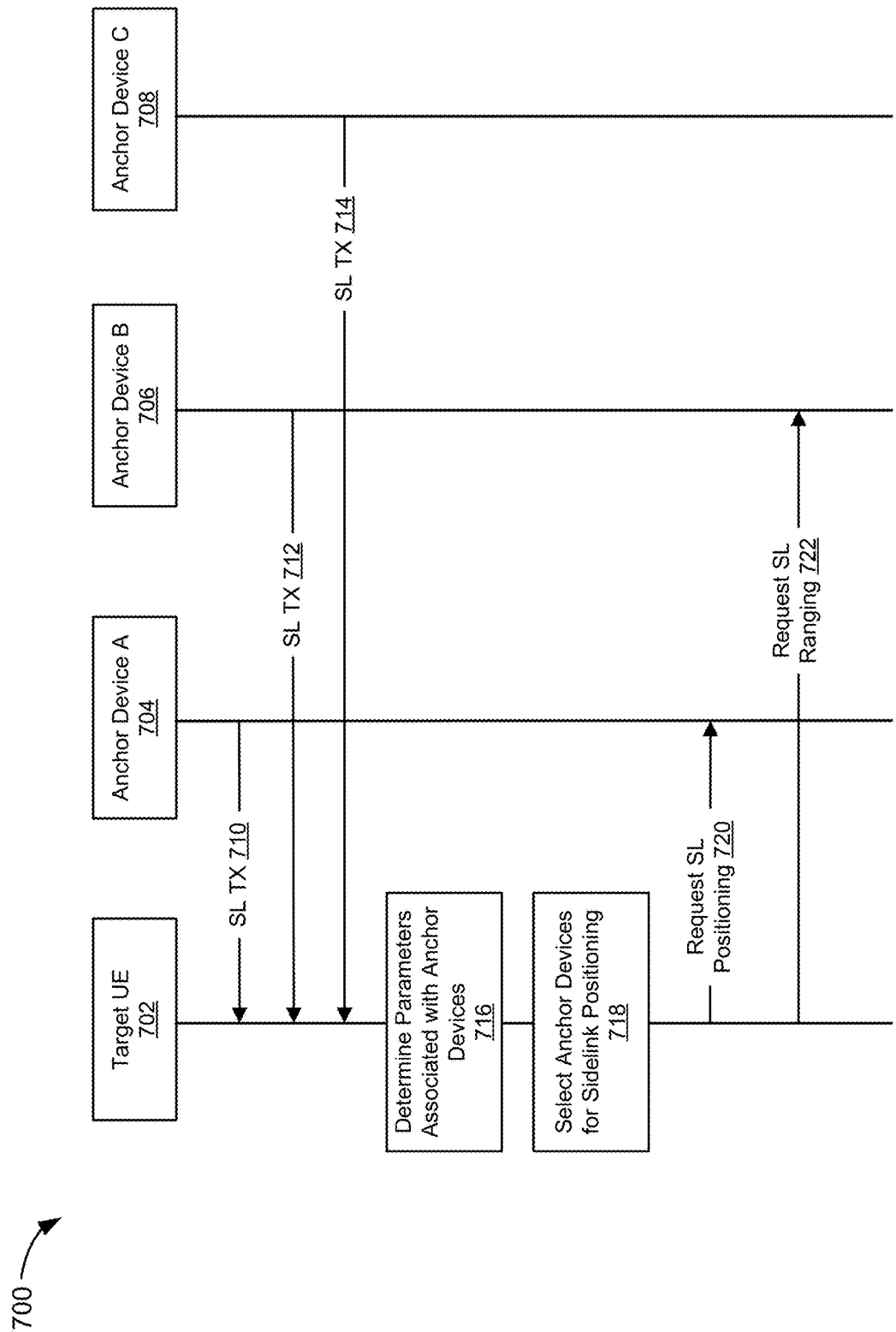
FIG. 7 is a sequence diagram illustrating an example of a sequence for performing anchor association for sidelink positioning, according to aspects of the disclosure.

FIG. 7 is a sequence diagram illustrating an example of a sequence 700 for performing anchor association for sidelink positioning. The sequence 700 may be performed by a target UE 702, an anchor device A 704, an anchor device B 706, and an anchor device C 708. At action 710, anchor device A 704 may send a sidelink transmission to target UE 702. At action 712, anchor device B 706 may send a sidelink transmission to target UE 702. At action 714, anchor device C 708 may send a sidelink transmission to target UE 702. In some aspects, one or more of the respective sidelink transmissions (e.g., action 710, 712, and 714) received by target UE 702 may correspond to a signal transmission that may be used by target UE 702 to determine one or more parameters associated with anchor device A 704, anchor device B 706, and anchor device C 708.

At action 716, target UE 702 may determine parameters associated with one or more of the anchor devices (e.g., anchor device A 704, anchor device B 706, and/or anchor device C 708). For example, in some aspects one or more of the respective sidelink transmissions (e.g., action 710, 712, and 714) received by target UE 702 may correspond to a signal transmission that may be used to measure receive signal received power (RSRP). In some cases, the signal transmission may correspond to a Physical Sidelink Shared Channel (PSSCH) transmission, a Channel State Information Reference Signal (CSI-RS) transmission, a Sounding Reference Signal (SRS) transmission, a Positioning Reference Signal (PRS) transmission, any other signal transmission, and/or any combination thereof.

In some cases, one or more of the respective sidelink transmissions (e.g., action 710, 712, and 714) may include location data (e.g., geolocation coordinates, zone identification, etc.) associated with a respective anchor device (e.g., anchor device A 704, anchor device B 706, and/or anchor device C 708). In some examples, target UE 702 may use the location data from an anchor device to determine the distance between target UE 702 and a respective anchor device. For instance, target UE 702 may use its current position (e.g., based on GNSS signal, location history, and/or Uu positioning) to determine the distance between target UE 702 and each of anchor device A 704, anchor device B 706, and anchor device C 708.

In some examples, one or more of the respective sidelink transmissions (e.g., action 710, 712, and 714) may be used to make a line-of-sight (LOS) or a non-line-of-sign (NLOS) determination between target UE 702 and each of anchor device A 704, anchor device B 706, and anchor device C 708. In some configurations, one or more of the respective sidelink transmissions (e.g., action 710, 712, and 714) may include an indication of anchor device capabilities. In some examples, anchor device capabilities may include a number of receiving antennas, a maximum transmission bandwidth, a maximum number of component carriers, a transmission power class, and/or any combination thereof. In some cases, one or more of the respective sidelink transmissions (e.g., action 710, 712, and 714) may include an anchor device category. In some aspects, anchor categories may include a road side unit (RSU) category, a vehicle on-board unit (OBU) category, and/or a pedestrian UE category.

At action 718, target UE 702 may select anchor devices for sidelink positioning based on the one or more parameters (e.g., RSRP, distance, LOS/NLOS, anchor capabilities, anchor categories, and/or any combination thereof). In some examples, target UE 702 may sort or rank anchor device A 704, anchor device B 706, and anchor device C 708 based on their respective RSRP measurement. In some cases, target UE 702 may prioritize association with anchor devices having the highest RSRP measurements. In some examples, target UE 702 may prioritize association with anchor devices that meet an RSRP measurement threshold value.

In some cases, target UE 702 may sort or rank anchor device A 704, anchor device B 706, and anchor device C 708 based on their proximity (e.g., distance measurement). In some cases, target UE 702 may prioritize association with anchor devices that are nearest to target UE 702. In some examples, target UE 702 may prioritize association with anchor devices that meet a distance measurement threshold value.

In some aspects, target UE 702 may associate with anchor devices based on a LOS/NLOS determination. In some cases, target UE 702 may sort anchor devices having LOS to target UE 702 based on RSRP, distance, anchor capabilities, and/or anchor category. For instance, target UE 702 may determine that anchor device A 704 and anchor device B 706 each have LOS to UE 702. In some aspects, target UE 702 may prioritize association with anchor device A 704 based on a higher RSRP measurement than anchor device B 706. In another example, target UE 702 may prioritized association with anchor device B 706 over anchor device A 704 based on a closer proximity (e.g., shorter distance) to anchor device B 706.

In some examples, target UE 702 may associate with anchor devices based on anchor capabilities. For instance, target UE 702 may prioritize association with anchor device A 704 based on a greater number of receiving antennas than anchor device B 706. In some configurations, target UE 702 may associate with anchor devices base on an anchor device category. For instance, target UE 702 may prioritize association with anchor device C 708 over anchor device B 706 because anchor device C 708 corresponds to a RSU category and anchor device B 706 corresponds to a pedestrian UE category.

At action 720, target UE 702 may send a request for sidelink positioning to anchor device A 704. In some aspects, target UE 702 may associate with anchor device A 704 for sidelink positioning based on one or more parameters associated with anchor device A 704 (e.g., RSRP, distance, LOS/NLOS, anchor capabilities, anchor categories, and/or any combination thereof). At action 722, target UE 702 may send a request for sidelink ranging (e.g., to determine a relative position) to anchor device B 706. In some examples, target UE 702 may associate with anchor device A 704 for sidelink ranging based on one or more parameters associated with anchor device A 704 (e.g., RSRP, distance, LOS/NLOS, anchor capabilities, anchor categories, and/or any combination thereof).

Figure 8:
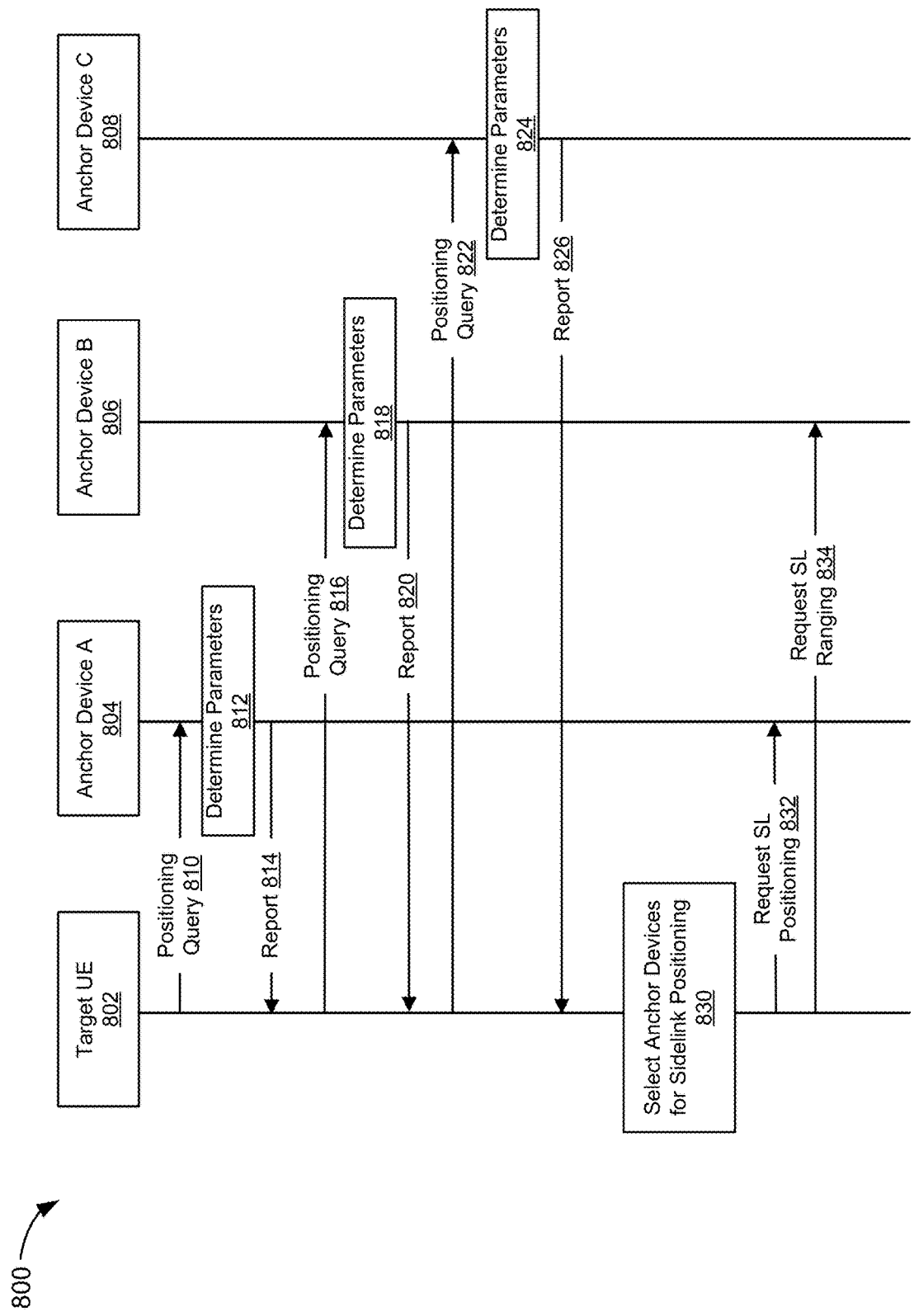
FIG. 8 is a sequence diagram illustrating another example of a sequence for performing anchor association for sidelink positioning, according to aspects of the disclosure.

FIG. 8 is a sequence diagram illustrating an example of a sequence 800 for performing anchor association for sidelink positioning. The sequence 800 may be performed by a target UE 802, an anchor device A 804, an anchor device B 806, and an anchor device C 808. At action 810, target UE 802 may send a positioning query message to anchor device A 804. In some examples, the positioning query message may include a request for one or more parameters associated with anchor device A 804. For example, the positioning query message may include: a request for an RSRP measurement, a request for a distance measurement, a request for location information, a request for a LOS/NLOS determination, a request for anchor device capabilities, a request for an anchor device category, and/or any combination thereof.

At action 812, anchor device A 804 may determine one or more parameters in response to the positioning query message. In some examples, anchor device A 804 may perform RSRP measurements in response to the positioning query message from target UE 802. In some aspects, anchor device A 804 may perform a distance measurement (e.g., between anchor device A 804 and target UE 802) in response to the positioning query message. In some configurations, anchor device A 804 may perform a LOS/NLOS determination in response to the positioning query message. In some instances, anchor device A 804 may provide an indication of anchor device capabilities and/or an anchor device category in response to the positioning query message.

At action 814, anchor device A may send a measurement report to target UE 802. In some aspects, the measurement report may include one or more parameters (e.g., RSRP measurement, distance measurement, LOS/NLOS, anchor capabilities, anchor categories, and/or any combination thereof). At action 816, target UE 802 may send a positioning query message to anchor device B 806. In some aspects, the positioning query message at action 816 may include one or more of the requests associated with the positioning query message associated with action 810. At action 818, anchor device B 806 may determine one or more parameters in response to the positioning query message. At action 820, anchor device B 806 may send a measurement report to target UE 802. In some examples, the one or more parameters determined by anchor device B 806 and the corresponding measurement report may include one or more of the same parameters as the measurement report provided by anchor device A 804 (e.g., at action 814).

At action 822, target UE 802 may send a positioning query message to anchor device C 808. In some aspects, the positioning query message at action 822 may include one or more of the requests associated with the positioning query message associated with action 810. At action 824, anchor device C 808 may determine one or more parameters in response to the positioning query message. At action 826, anchor device C 808 may send a measurement report to target UE 802. In some examples, the one or more parameters determined by anchor device C 808 and the corresponding measurement report may include one or more of the same parameters as the measurement report provided by anchor device A 804 (e.g., at action 814).

At action 830, target UE 802 may select anchor devices for sidelink positioning based on the one or more parameters (e.g., RSRP, distance, LOS/NLOS, anchor capabilities, anchor categories, and/or any combination thereof) received in the measurement reports from the respective anchor devices. As noted above with respect to target UE 702 and UE 602, target UE 802 may select one or more anchor devices for sidelink positioning association by ranking and sorting anchor device A 804, anchor device B 806, and anchor device C 808 using on any combination of parameters or characteristics.

At action 832, target UE 802 may send a request for sidelink positioning to anchor device A 804. In some aspects, target UE 802 may associate with anchor device A 804 for sidelink positioning based on one or more parameters associated with anchor device A 804 (e.g., RSRP, distance, LOS/NLOS, anchor capabilities, anchor categories, and/or any combination thereof). At action 834, target UE 802 may send a request for sidelink ranging (e.g., to determine a relative position) to anchor device B 806. In some examples, target UE 802 may associate with anchor device A 804 for sidelink ranging based on one or more parameters associated with anchor device A 804 (e.g., RSRP, distance, LOS/NLOS, anchor capabilities, anchor categories, and/or any combination thereof).

Figure 9:
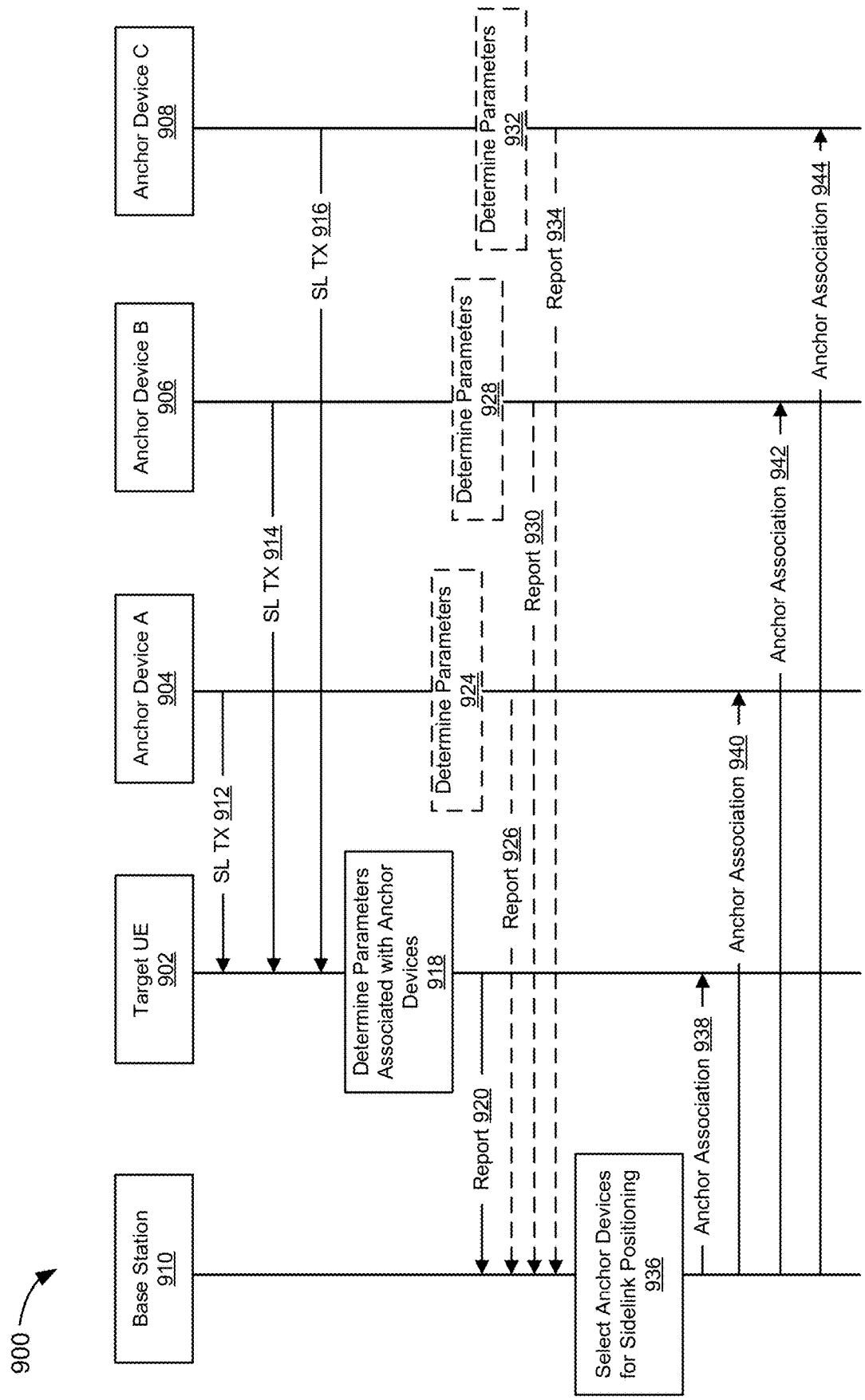
FIG. 9 is a sequence diagram illustrating another example of a sequence for performing anchor association for sidelink positioning, according to aspects of the disclosure.

FIG. 9 is a sequence diagram illustrating an example of a sequence 900 for performing anchor association for sidelink positioning. The sequence 900 may be performed by a target UE 902, an anchor device A 904, an anchor device B 906, an anchor device C 908 and a base station 910. At action 912, 914, and 916, the sequence 900 may include receiving sidelink transmission from anchor device A 904, anchor device B 906, and anchor device C 908, respectively. At action 918, target UE 902 may determine one or more parameters associated with anchor device A 904, anchor device B 906, and anchor device C 908 (e.g., based on the sidelink transmissions). In some aspects, the one or more parameters may include an RSRP measurement, a distance measurement, a LOS/NLOS determination, one or more anchor capabilities, an anchor category, and/or any combination thereof.

At action 920, target UE 902 may send a measurement report to base station 910. In some aspects, the measurement report may include one or more of the parameters determined by target UE 902 based on the sidelink transmissions from anchor device A 904, anchor device B 906, and/or anchor device C 908. At action 936, base station 910 may use the measurement report to select anchor devices for sidelink positioning association for target UE 902. In some examples, base station 910 may select one or more anchor devices for sidelink positioning association by ranking and sorting anchor device A 904, anchor device B 906, and anchor device C 908 using on any combination of parameters or characteristics.

In other aspects, one or more of the anchor devices may optionally determine one or more parameters (e.g., RSRP measurement, distance measurement, LOS/NLOS, anchor capabilities, anchor categories, and/or any combination thereof). For example, at action 924, anchor device A 904 may determine parameters; at action 928, anchor device B 906 may determine parameters; and at action 932, anchor device C 908 may determine parameters. In some examples, an anchor device may determine parameters in response to a positioning query message from target UE 902 (not illustrated). In some aspects, anchor device A 904, anchor device B 906, and anchor device C 908 may send measurement reports to base station 910 (see, e.g., actions 926, 930, and 934). In some cases, base station 910 may use the measurement report from target UE 902, anchor device A 904, anchor device B 906, and/or anchor device C 908 to select anchor devices for sidelink positioning for target UE 902.

At action 938, base station 910 may send an indication of the anchor association to target UE 902. At action 940, base station 910 may send an indication of the anchor association to anchor device A 904. At action 942, base station 910 may send an indication of the anchor association to anchor device B 906. At action 944, base station 910 may send an indication of the anchor association to anchor device C 908.

Figure 10:
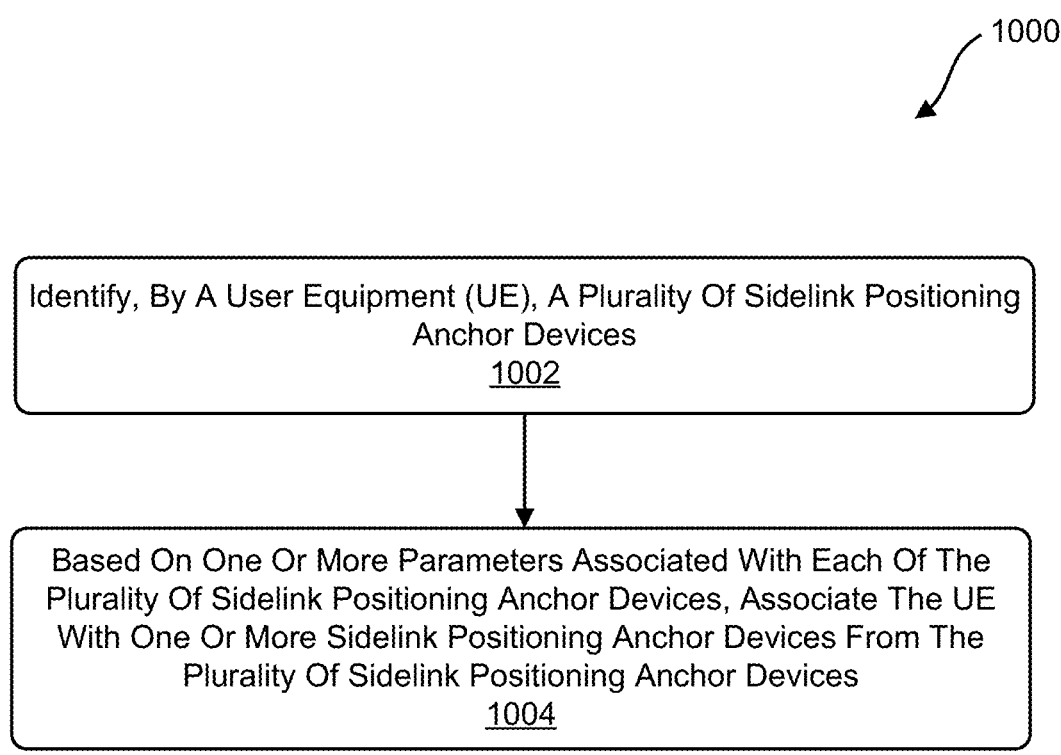
FIG. 10 is a flow diagram illustrating an example of a process for performing anchor association for sidelink positioning, according to aspects of the disclosure.

FIG. 10 is a flowchart diagram illustrating an example of a process 1000 for performing anchor association for sidelink positioning. At block 1002, the process 1000 may include identifying, by a user equipment (UE), a plurality of sidelink positioning anchor devices. For example, UE 602 may identify RSU 604, RSU 606, pedestrian UE 608, pedestrian UE 610, vehicle 612, and vehicle 614 as sidelink positioning anchor devices.

At block 1004, the process 1000 may include associating the UE with one or more sidelink positioning anchor devices from the plurality of sidelink positioning anchor devices based on one or more parameters associated with each of the plurality of sidelink positioning anchor devices. For example, UE 602 may associate with RSU 604 and vehicle 614 based on one or more parameters associated with each of RSU 604, RSU 606, pedestrian UE 608, pedestrian UE 610, vehicle 612, and vehicle 614. In some aspects, the one or more sidelink positioning anchor devices may have line of sight to the UE. For instance, RSU 604 and vehicle 614 may have line of sight to UE 602.

In some aspects, the one or more parameters may include at least one of a reference signal received power (RSRP) measurement associated with each of the plurality of sidelink positioning anchor devices, a distance measurement associated with each of the plurality of sidelink positioning anchor devices, a line of sight measurement associated with each of the plurality of sidelink positioning anchor devices, an anchor device capability associated with each of the plurality of sidelink positioning anchor devices, and an anchor device category associated with each of the plurality of sidelink positioning anchor devices. In some examples, the RSRP measurement associated with each of the plurality of sidelink positioning anchor devices may correspond to at least one of a demodulation reference signal (DMRS), a channel state information reference signal (CSI-RS), a sounding reference signal (SRS), and a positioning reference signal (PRS).

In some examples, the distance measurement associated with each of the plurality of sidelink positioning anchor devices may be based on at least one of a geolocation associated with each of the plurality of sidelink positioning anchor devices and a zone identifier associated with each of the plurality of sidelink positioning anchor devices. For example, the distance measurement between UE 602 and vehicle 612 may be based on a geolocation (e.g., based on GPS coordinates) associated with vehicle 612.

In some cases, the anchor device capability associated with each of the plurality of sidelink positioning anchor devices includes at least one of a number of receiving antennas, a maximum transmission bandwidth, a maximum number of component carriers, and a transmission power class associated with each of the plurality of sidelink positioning anchor devices. In some aspects, the anchor device category associated with each of the plurality of sidelink positioning anchor devices includes at least one of a stationary road side unit (RSU) category, a vehicle on-board unit (OBU) category, and a pedestrian UE category. For example, RSU 604 may be associated with a road side unit category, pedestrian UE 608 may be associated with a pedestrian UE category, and vehicle 612 may be associated with a vehicle on-board unit category.

In some examples, the process 1000 may include determining, by the UE, the one or more parameters associated with each of the plurality of sidelink positioning anchor devices. For example, UE 602 may determine RSRP measurements, distance measurements, line-of-sight measurements, anchor device capabilities, and/or an anchor category associated with each of RSU 604, RSU 606, pedestrian UE 608, pedestrian UE 610, vehicle 612, and vehicle 614.

In some aspects, the process 1000 may include receiving, by the UE from the plurality of sidelink positioning anchor devices, the one or more parameters associated with each of the plurality of sidelink positioning devices. In some examples, UE 602 may receive RSRP measurements, distance measurements, line-of-sight measurements, anchor device capabilities, and/or an anchor category from each of RSU 604, RSU 606, pedestrian UE 608, pedestrian UE 610, vehicle 612, and vehicle 614. In some cases, the process may include transmitting, by the UE, a positioning query message to the plurality of sidelink positioning anchor devices, wherein the one or more parameters are received by the UE based on the positioning query message. For example, UE 602 may send a positioning query message (e.g., positioning query at action 810 of FIG. 8) to each of RSU 604, RSU 606, pedestrian UE 608, pedestrian UE 610, vehicle 612, and vehicle 614.

In some cases, the process 1000 may include associating the UE with the one or more sidelink positioning anchor devices based on one or more RSRP measurements of the one or more sidelink positioning anchor devices being greater than one or more RSRP measurements of other sidelink positioning anchor devices of the plurality of sidelink positioning anchor devices. For example, UE 602 may be associated with RSU 604 based on an RSRP measurement of RSU 604 being greater than an RSRP measurement of RSU 606.

In some aspects, the process 1000 may include associating the UE with the one or more sidelink positioning anchor devices from the plurality of sidelink positioning anchor devices based on one or more RSRP measurements of the one or more sidelink positioning anchor devices being greater than an RSRP measurement threshold value. For example, UE 602 may be associated with RSU 604 based on an RSRP measurement of RSU 604 being greater than an RSRP measurement threshold value.

In some examples, the process 1000 may include associating the UE with the one or more sidelink positioning anchor devices based on one or more distance measurements of the one or more sidelink positioning anchor devices being less than one or more distance measurements of other sidelink positioning anchor devices of the plurality of sidelink positioning anchor devices. For instance, UE 602 may be associated with vehicle 614 based on a distance measurement that is less than a distance measurement corresponding to any of RSU 604, RSU 606, pedestrian UE 608, pedestrian UE 610, and vehicle 612.

In some aspects, the process 1000 may include transmitting the one or more parameters to a network entity and receiving an indication of the one or more sidelink positioning anchor devices from the network entity. For example, UE 602 may transmit a measurement report that includes the one or more parameters to base station 616. In some aspects, base station 616 and/or location server 620 may provide an indication of the one or more selected sidelink positioning anchor devices to UE 602.

In some cases, the process 1000 may include determining, based on the association with the one or more sidelink positioning anchor devices, at least one of a relative position corresponding to the UE and an absolute position corresponding to the UE. For example, UE 602 may determine an absolute location based on the association with RSU 604 and vehicle 614. In another example, UE 602 may determine a position that is relative to the position of vehicle 614 based on the association with vehicle 614.

Figure 11:
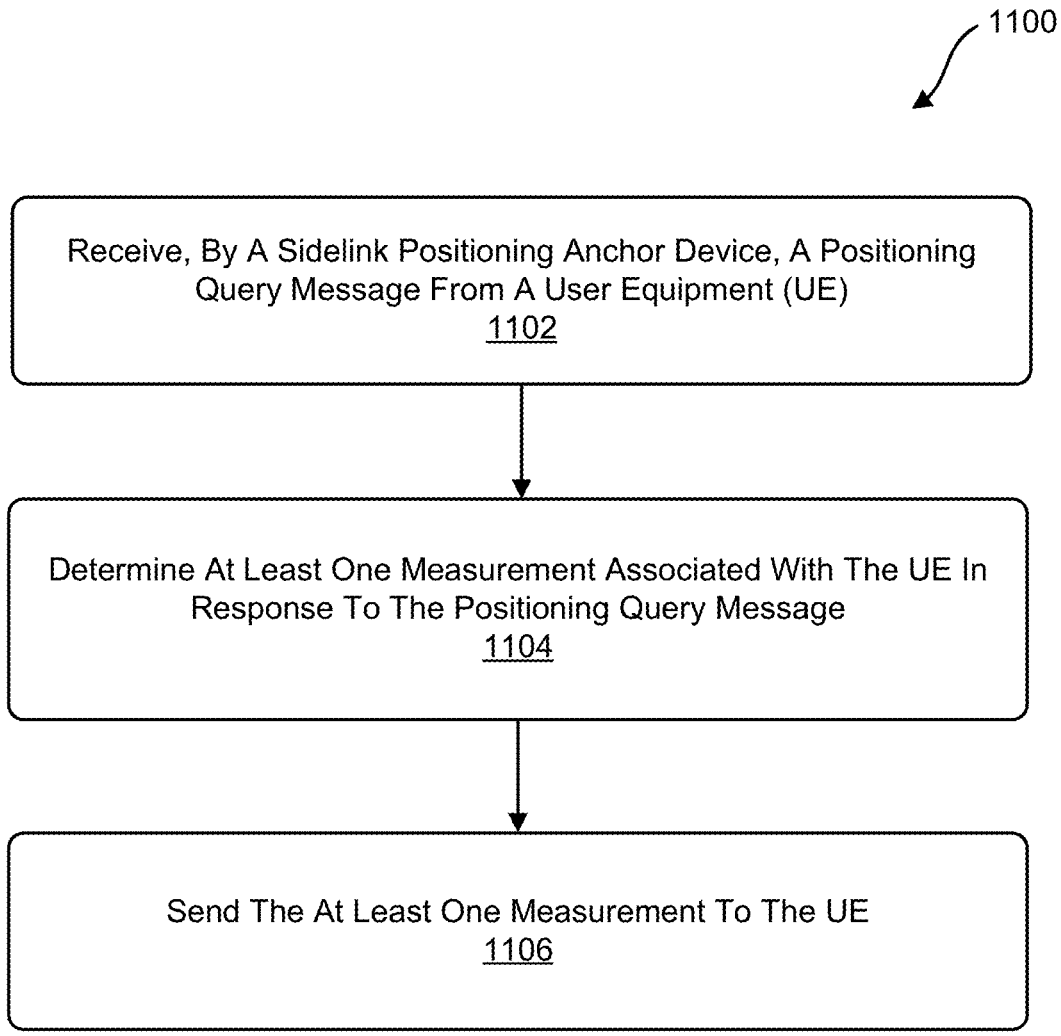
FIG. 11 is a flow diagram illustrating another example of a process for performing anchor association for sidelink positioning, according to aspects of the disclosure.

FIG. 11 is a flowchart diagram illustrating an example of a process 1100 for performing anchor association for sidelink positioning. At block 1102, the process 1100 includes receiving, by a sidelink positioning anchor device, a positioning query message from a user equipment (UE). For instance, anchor device A 804 may receive a positioning query message from target UE 802. In some examples, the positioning query message may include a request for one or more parameters associated with anchor device A 804. For example, the positioning query message may include: a request for an RSRP measurement, a request for a distance measurement, a request for location information, a request for a LOS/NLOS determination, a request for anchor device capabilities, a request for an anchor device category, and/or any combination thereof.

At block 1104, the process 1100 includes determining at least one measurement associated with the UE in response to the positioning query message. In some aspects, the at least one measurement includes at least one of a reference signal received power (RSRP) measurement, a distance measurement, and a line of sight measurement. In some cases, the RSRP measurement may correspond to at least one of a demodulation reference signal (DMRS), a channel state information reference signal (CSI-RS), a sounding reference signal (SRS), and a positioning reference signal (PRS).

At block 1106, the process 1100 includes sending the at least one measurement to the UE. For example, anchor device A 804 may send a measurement report to target UE 802. In some aspects, the process 1100 may include transmitting, by the sidelink positioning anchor device, a sidelink message including an indication of one or more anchor device properties, wherein the one or more anchor device properties include at least one of an anchor device location, an anchor device capability, and an anchor device category. In some examples, the sidelink message may include the at least one measurement. For instance, the measurement report from anchor device A 804 to target UE 802 may include a measurement (e.g., distance measurement, RSRP measurement, etc.) as well as anchor device properties.

In some aspects, the anchor device capability may include at least one of a number of receiving antennas, a maximum transmission bandwidth, a maximum number of component carriers, and a transmission power class. In some examples, the anchor device category may include a stationary road side unit (RSU) category, a vehicle on-board unit (OBU) category, or a pedestrian UE category. For example, RSU 604 may transmit a sidelink message to UE 602 indicating an RSU category. In some examples, RSU 604 may transmit a sidelink message to UE 602 indicating device capabilities (e.g., number of antennas).

Figure 12:
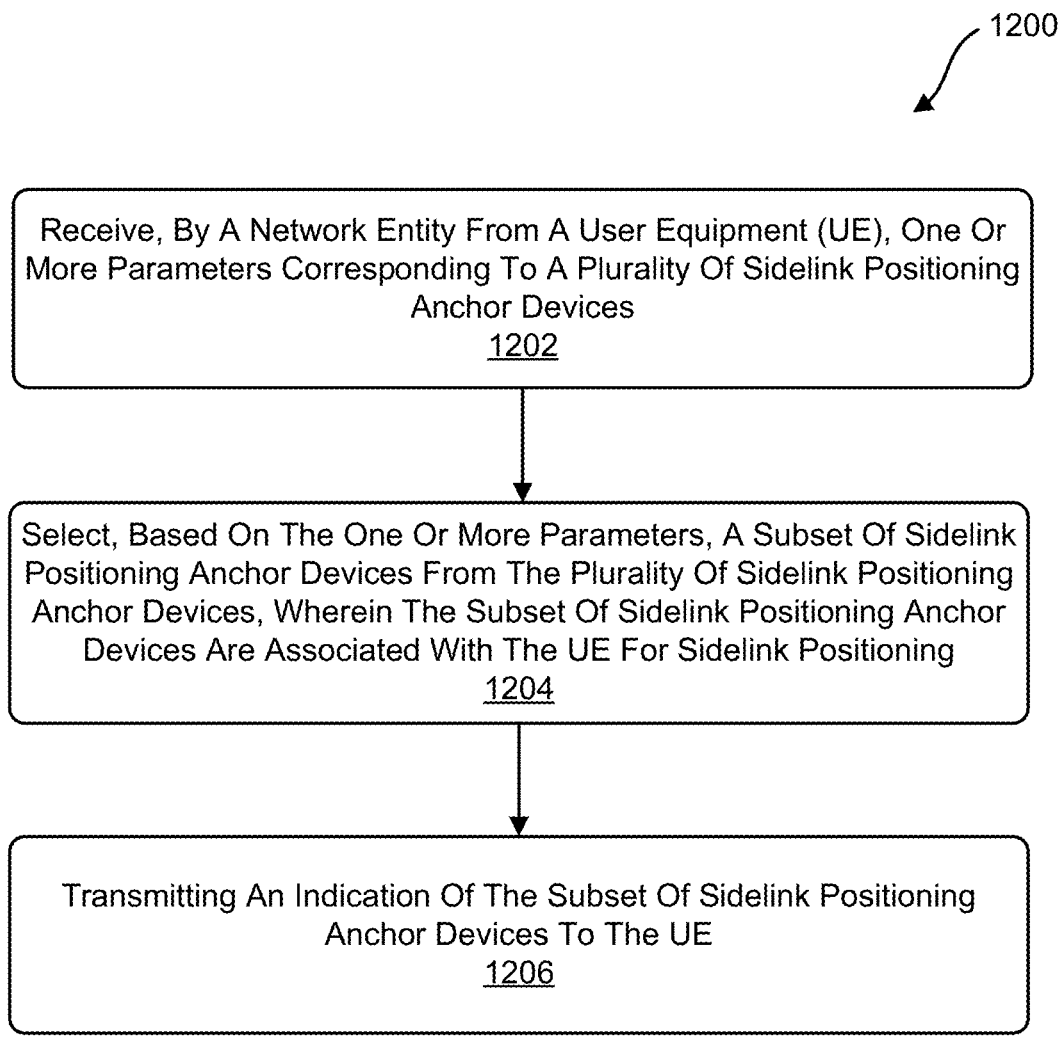
FIG. 12 is a flow diagram illustrating another example of a process for performing anchor association for sidelink positioning, according to aspects of the disclosure.

FIG. 12 is a flowchart diagram illustrating an example of a process 1200 for performing anchor association for sidelink positioning. At block 1202, the process 1200 includes receiving, by a network entity from a user equipment (UE), one or more parameters corresponding to a plurality of sidelink positioning anchor device. For example, base station 616 may receive one or more parameters corresponding to RSU 604, RSU 606, pedestrian UE 608, pedestrian UE 610, vehicle 612, and/or vehicle 614.

In some examples, the one or more parameters include at least one of a reference signal received power (RSRP) measurement associated with each of the plurality of sidelink positioning anchor devices, a distance measurement associated with each of the plurality of sidelink positioning anchor devices, a line of sight measurement associated with each of the plurality of sidelink positioning anchor devices, an anchor device capability associated with each of the plurality of sidelink positioning anchor devices, an anchor device category associated with each of the plurality of sidelink positioning anchor devices, an identifier associated with each of the plurality of sidelink positioning anchor devices, an identifier associated with the UE, and a timestamp indicating a time associated with measurement of the one or more parameters. In some aspects, the RSRP measurement associated with each of the plurality of sidelink positioning anchor devices corresponds to at least one of a demodulation reference signal (DMRS), a channel state information reference signal (CSI-RS), a sounding reference signal (SRS), and a positioning reference signal (PRS). In some cases, the distance measurement associated with each of the plurality of sidelink positioning anchor devices is based on at least one of a geolocation associated with each of the plurality of sidelink positioning anchor devices and a zone identifier associated with each of the plurality of sidelink positioning anchor devices.

In some examples, the anchor device capability associated with each of the plurality of sidelink positioning anchor devices includes at least one of a number of receiving antennas, a maximum transmission bandwidth, a maximum number of component carriers, and a transmission power class associated with each of the plurality of sidelink positioning anchor devices. In some configurations, the anchor device category associated with each of the plurality of sidelink positioning anchor devices includes at least one of a stationary road side unit (RSU) category, a vehicle onboard unit (OBU) category, and a pedestrian UE category.

At block 1204, the process 1200 includes selecting, based on the one or more parameters, a subset of sidelink positioning anchor devices from the plurality of sidelink positioning anchor devices, wherein the subset of sidelink positioning anchor devices are associated with the UE for sidelink positioning. For example, base station 616 may select RSU 604 and vehicle 614 to be associated with UE 602 for sidelink positioning. In some examples, the subset of sidelink positioning anchor devices has a line of sight to the UE.

At block 1206, the process 1200 includes transmitting an indication of the subset of sidelink positioning anchor devices to the UE. For instance, base station 616 may transmit an indication of the selected sidelink positioning anchor devices to UE 602.

In some aspects, the process 1200 may include determining a value of a respective parameter from the one or more parameters for each the plurality of sidelink positioning anchor devices and selecting the subset of sidelink positioning anchor devices based on the value of the respective parameter for each the plurality of sidelink positioning anchor devices. In some aspects, the process may include selecting the subset of sidelink positioning anchor devices based on one or more RSRP measurements of the subset of sidelink positioning anchor devices being greater than one or more RSRP measurements of other sidelink positioning anchor devices of the plurality of sidelink positioning anchor devices.

In some examples, the process 1200 may include selecting the subset of sidelink positioning anchor devices based on one or more RSRP measurements of the subset of sidelink positioning anchor devices being greater than an RSRP measurement threshold.

In some aspects, the process 1200 may include selecting the subset of sidelink positioning anchor devices based on one or more distance measurements of the subset of sidelink positioning anchor devices being less than one or more distance measurements of other sidelink positioning anchor devices of the plurality of sidelink positioning anchor devices.

In some examples, the processes described herein (e.g., process 1000, process 1100, process 1200, and/or other process described herein) may be performed by a computing device or apparatus (e.g., a UE, a base station, etc.). In one example, the process 1000 and/or the process 1100 may be performed by a wireless communication device, such as a UE (e.g., the vehicle 404 of FIG. 4, a mobile device, and/or other UE or device). In another example, the process 1000 and/or the process 1100 may be performed by a computing device with the computing system 1300 shown in FIG. 13. For instance, a wireless communication device (e.g., the vehicle 404 of FIG. 4, mobile device, and/or other UE or device) with the computing architecture shown in FIG. 13 may include the components of the UE and may implement the operations of FIG. 10 and/or the operations of FIG. 11. In another example, process 1200 may be performed by a base station, such as the base station 102 of FIG. 1. In another example, the process 1200 may be performed by a computing device with the computing system 1300 shown in FIG. 13. For instance, a base station (e.g., the base station 102 of FIG. 1) with the computing architecture shown in FIG. 13 may include the components of the base station and may implement the operations of FIG. 12.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 1000 is illustrated as logical flow diagrams, the operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1000 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
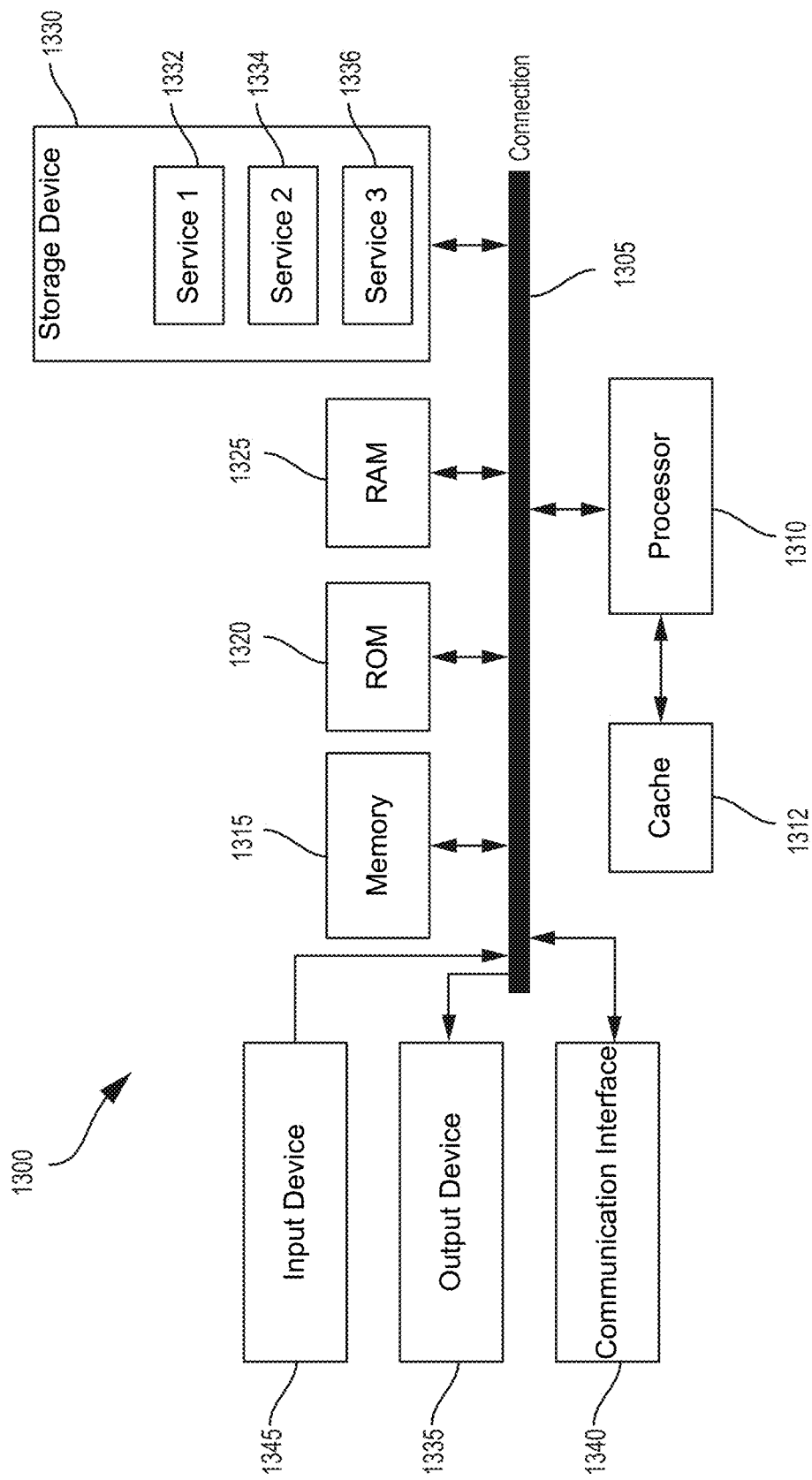
FIG. 13 is a block diagram illustrating an example of a computing system, according to aspects of the disclosure.

FIG. 13 is a diagram illustrating an example of a system for implementing certain aspects of the present technology. In particular, FIG. 13 illustrates an example of computing system 1300, which may be for example any computing device making up internal computing system, a remote computing system, a camera, or any component thereof in which the components of the system are in communication with each other using connection 1305. Connection 1305 may be a physical connection using a bus, or a direct connection into processor 1310, such as in a chipset architecture. Connection 1305 may also be a virtual connection, networked connection, or logical connection.

In some embodiments, computing system 1300 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example system 1300 includes at least one processing unit (CPU or processor) 1310 and connection 1305 that communicatively couples various system components including system memory 1315, such as read-only memory (ROM) 1320 and random access memory (RAM) 1325 to processor 1310. Computing system 1300 may include a cache 1312 of high-speed memory connected directly with, in close proximity to, or integrated as part of processor 1310.

Processor 1310 may include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which may represent any number of input mechanisms, such as a microphone for speech, a touch-sensitive screen for gesture or graphical input, keyboard, mouse, motion input, speech, etc. Computing system 1300 may also include output device 1335, which may be one or more of a number of output mechanisms. In some instances, multimodal systems may enable a user to provide multiple types of input/output to communicate with computing system 1300.

Computing system 1300 may include communications interface 1340, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON' wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 1330 may include software services, servers, services, etc., that when the code that defines such software is executed by the processor 1310, it causes the system to perform a function. In some embodiments, a hardware service that performs a particular function may include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative examples of the disclosure include:

Aspect 1: A wireless communication device for wireless communication. The wireless communication device includes at least one memory and at least one processor coupled to the at least one memory. The at least one processor is configured to: identify a plurality of sidelink positioning anchor devices; and based on one or more parameters associated with each of the plurality of sidelink positioning anchor devices, associate the wireless communication device with one or more sidelink positioning anchor devices from the plurality of sidelink positioning anchor devices.

Aspect 2: The wireless communication device according to aspect 1, wherein the at least one processor is further configured to: determine the one or more parameters associated with each of the plurality of sidelink positioning anchor devices.

Aspect 3: The wireless communication device according to any one of aspects 1 to 2, wherein the at least one processor is further configured to: receive, from the plurality of sidelink positioning anchor devices, the one or more parameters associated with each of the plurality of sidelink positioning anchor devices.

Aspect 4: The wireless communication device according to aspect 3, wherein the at least one processor is further configured to: transmit a positioning query message to the plurality of sidelink positioning anchor devices, wherein the one or more parameters are received by the UE based on the positioning query message.

Aspect 5: The wireless communication device according to any of aspects 1 to 4, wherein the one or more parameters include at least one of a reference signal received power (RSRP) measurement associated with each of the plurality of sidelink positioning anchor devices, a distance measurement associated with each of the plurality of sidelink positioning anchor devices, a line of sight measurement associated with each of the plurality of sidelink positioning anchor devices, an anchor device capability associated with each of the plurality of sidelink positioning anchor devices, and an anchor device category associated with each of the plurality of sidelink positioning anchor devices.

Aspect 6: The wireless communication device according to aspect 6, wherein the RSRP measurement associated with each of the plurality of sidelink positioning anchor devices corresponds to at least one of a demodulation reference signal (DMRS), a channel state information reference signal (CSI-RS), a sounding reference signal (SRS), and a positioning reference signal (PRS).

Aspect 7: The wireless communication device according to any of aspects 5 to 6, wherein the at least one processor is further configured to: associate the wireless communication device with the one or more sidelink positioning anchor devices based on one or more RSRP measurements of the one or more sidelink positioning anchor devices being greater than one or more RSRP measurements of other sidelink positioning anchor devices of the plurality of sidelink positioning anchor devices.

Aspect 8: The wireless communication device according to any of aspects 5 to 7, wherein the at least one processor is further configured to: associate the mobile with the one or more sidelink positioning anchor devices from the plurality of sidelink positioning anchor devices based on one or more RSRP measurements of the one or more sidelink positioning anchor devices being greater than an RSRP measurement threshold value.

Aspect 9: The wireless communication device according to any of aspects 5 to 8, wherein the distance measurement associated with each of the plurality of sidelink positioning anchor devices is based on at least one of a geolocation associated with each of the plurality of sidelink positioning anchor devices and a zone identifier associated with each of the plurality of sidelink positioning anchor devices.

Aspect 10: The wireless communication device according to any of aspects 5 to 9, wherein the at least one processor is further configured to: associate the wireless communication device with the one or more sidelink positioning anchor devices based on one or more distance measurements of the one or more sidelink positioning anchor devices being less than one or more distance measurements of other sidelink positioning anchor devices of the plurality of sidelink positioning anchor devices.

Aspect 11: The wireless communication device according to any of aspects 5 to 10, wherein the one or more sidelink positioning anchor devices have line of sight to the UE.

Aspect 12: The wireless communication device according to any of aspects 5 to 11, wherein the anchor device capability associated with each of the plurality of sidelink positioning anchor devices includes at least one of a number of receiving antennas, a maximum transmission bandwidth, a maximum number of component carriers, and a transmission power class associated with each of the plurality of sidelink positioning anchor devices.

Aspect 13: The wireless communication device according to any of aspects 5 to 12, wherein the anchor device category associated with each of the plurality of sidelink positioning anchor devices includes at least one of a stationary road side unit (RSU) category, a vehicle on-board unit (OBU) category, and a pedestrian UE category.

Aspect 14: The wireless communication device according to any of aspect 1 to 13, wherein the at least one processor is further configured to: transmit the one or more parameters to a network entity; and receive an indication of the one or more sidelink positioning anchor devices from the network entity.

Aspect 15: The wireless communication device according to any of aspects 1 to 14, wherein the at least one processor is further configured to: determine, based on the association with the one or more sidelink positioning anchor devices, at least one of a relative position corresponding to the wireless communication device and an absolute position corresponding to the wireless communication device.

Aspect 16: A method of performing any of the operations of aspects 1 to 15.

Aspect 17: A computer-readable storage medium storing instructions that, when executed, cause one or more processors to perform any of the operations of aspects 1 to 15.

Aspect 18: An apparatus comprising means for performing any of the operations of aspects 1 to 15.

Aspect 19: A base station for wireless communication. The base station includes at least one memory and at least one processor coupled to the at least one memory. The at least one processor is configured to: receive, from a user equipment (UE), one or more parameters corresponding to a plurality of sidelink positioning anchor devices; select, based on the one or more parameters, a subset of sidelink positioning anchor devices from the plurality of sidelink positioning anchor devices, wherein the subset of sidelink positioning anchor devices are associated with the UE for sidelink positioning; and transmit an indication of the subset of sidelink positioning anchor devices to the UE.

Aspect 20: The base station according to aspect 19, wherein the one or more parameters include at least one of a reference signal received power (RSRP) measurement associated with each of the plurality of sidelink positioning anchor devices, a distance measurement associated with each of the plurality of sidelink positioning anchor devices, a line of sight measurement associated with each of the plurality of sidelink positioning anchor devices, an anchor device capability associated with each of the plurality of sidelink positioning anchor devices, an anchor device category associated with each of the plurality of sidelink positioning anchor devices, an identifier associated with each of the plurality of sidelink positioning anchor devices, an identifier associated with the UE, and a timestamp indicating a time associated with measurement of the one or more parameters.

Aspect 21: The base station according to aspect 20, wherein the RSRP measurement associated with each of the plurality of sidelink positioning anchor devices corresponds to at least one of a demodulation reference signal (DMRS), a channel state information reference signal (CSI-RS), a sounding reference signal (SRS), and a positioning reference signal (PRS).

Aspect 22: The base station according to any of aspects 19 to 21, wherein to select the subset of sidelink positioning anchor device the at least one processor is further configured to: determine a value of a respective parameter from the one or more parameters for each the plurality of sidelink positioning anchor devices; and select the subset of sidelink positioning anchor devices based on the value of the respective parameter for each the plurality of sidelink positioning anchor devices.

Aspect 23: A method of performing any of the operations of aspects 19 to 22.

Aspect 24: A computer-readable storage medium storing instructions that, when executed, cause one or more processors to perform any of the operations of aspects 19 to 22.

Aspect 25: An apparatus comprising means for performing any of the operations of aspects 19 to 22.

Aspect 26: A sidelink positioning anchor device. The anchor device includes at least one memory and at least one processor coupled to the at least one memory. The at least one processor is configured to: receive a positioning query message from a user equipment (UE); determine at least one measurement associated with the UE in response to the positioning query message; and send the at least one measurement to the UE.

Aspect 27: The anchor device according to aspect 26, wherein the at least one measurement includes at least one of a reference signal received power (RSRP) measurement, a distance measurement, and a line of sight measurement.

Aspect 28: The anchor device according to aspect 27, wherein the RSRP measurement corresponds to at least one of a demodulation reference signal (DMRS), a channel state information reference signal (CSI-RS), a sounding reference signal (SRS), and a positioning reference signal (PRS).

Aspect 29: The anchor device according to any of aspects 26 to 28, wherein the at least one processor is further configured to: transmit a sidelink message including an indication of one or more anchor device properties, wherein the one or more anchor device properties include at least one of an anchor device location, an anchor device capability, and an anchor device category.

Aspect 30: The anchor device according to aspect 29, wherein the anchor device capability includes at least one of a number of receiving antennas, a maximum transmission bandwidth, a maximum number of component carriers, and a transmission power class.

Aspect 31: The anchor device according to any of aspects 29 to 30, wherein the anchor device category includes a stationary road side unit (RSU) category, a vehicle on-board unit (OBU) category, or a pedestrian UE category.

Aspect 32: The anchor device according to any of aspects 29 to 31, wherein the sidelink message includes the at least one measurement.

Aspect 33: A method of performing any of the operations of aspects 26 to 32.

Aspect 34: A computer-readable storage medium storing instructions that, when executed, cause one or more processors to perform any of the operations of aspects 26 to 32.

Aspect 35: An apparatus comprising means for performing any of the operations of aspects 26 to 32.

What is claimed is:

1. A method for wireless communications, comprising:
    identifying, by a user equipment (UE), a plurality of sidelink positioning anchor devices; and
    based on one or more parameters associated with each of the plurality of sidelink positioning anchor devices, associating the UE with one or more sidelink positioning anchor devices from the plurality of sidelink positioning anchor devices, wherein the one or more parameters include at least one of a reference signal received power (RSRP) measurement associated with each of the plurality of sidelink positioning anchor devices, a distance measurement associated with each of the plurality of sidelink positioning anchor devices, a line of sight measurement associated with each of the plurality of sidelink positioning anchor devices, an anchor device capability associated with each of the plurality of sidelink positioning anchor devices, and an anchor device category associated with each of the plurality of sidelink positioning anchor devices.

2. The method of claim 1, further comprising:
    determining, by the UE, the one or more parameters associated with each of the plurality of sidelink positioning anchor devices.

3. The method of claim 1, further comprising:
    receiving, by the UE from the plurality of sidelink positioning anchor devices, the one or more parameters associated with each of the plurality of sidelink positioning anchor devices.

4. The method of claim 3, further comprising:
    transmitting, by the UE, a positioning query message to the plurality of sidelink positioning anchor devices, wherein the one or more parameters are received by the UE based on the positioning query message.

5. The method of claim 1, wherein the RSRP measurement associated with each of the plurality of sidelink positioning anchor devices corresponds to at least one of a demodulation reference signal (DMRS), a channel state information reference signal (CSI-RS), a sounding reference signal (SRS), and a positioning reference signal (PRS).

6. The method of claim 1, further comprising:
    associating the UE with the one or more sidelink positioning anchor devices based on one or more RSRP measurements of the one or more sidelink positioning anchor devices being greater than one or more RSRP measurements of other sidelink positioning anchor devices of the plurality of sidelink positioning anchor devices.

7. The method of claim 1, further comprising:
    associating the UE with the one or more sidelink positioning anchor devices from the plurality of sidelink positioning anchor devices based on one or more RSRP measurements of the one or more sidelink positioning anchor devices being greater than an RSRP measurement threshold value.

8. The method of claim 1, wherein the distance measurement associated with each of the plurality of sidelink positioning anchor devices is based on at least one of a geolocation associated with each of the plurality of sidelink positioning anchor devices and a zone identifier associated with each of the plurality of sidelink positioning anchor devices.

9. The method of claim 1, further comprising:
    associating the UE with the one or more sidelink positioning anchor devices based on one or more distance measurements of the one or more sidelink positioning anchor devices being less than one or more distance measurements of other sidelink positioning anchor devices of the plurality of sidelink positioning anchor devices.

10. The method of claim 1, wherein the one or more sidelink positioning anchor devices have line of sight to the UE.

11. The method of claim 1, wherein the anchor device capability associated with each of the plurality of sidelink positioning anchor devices includes at least one of a number of receiving antennas, a maximum transmission bandwidth, a maximum number of component carriers, and a transmission power class associated with each of the plurality of sidelink positioning anchor devices.

12. The method of claim 1, wherein the anchor device category associated with each of the plurality of sidelink positioning anchor devices includes at least one of a stationary road side unit (RSU) category, a vehicle on-board unit (OBU) category, and a pedestrian UE category.

13. The method of claim 1, further comprising:
transmitting the one or more parameters to a network entity; and
receiving an indication of the one or more sidelink positioning anchor devices from the network entity.

14. The method of claim 1, further comprising:
determining, based on the association with the one or more sidelink positioning anchor devices, at least one of a relative position corresponding to the UE and an absolute position corresponding to the UE.

15. A wireless communication device for wireless communication, comprising:
one or more memories; and
one or more processors coupled to the one or more memories and configured to:
identify a plurality of sidelink positioning anchor devices; and
based on one or more parameters associated with each of the plurality of sidelink positioning anchor devices, associate the wireless communication device with one or more sidelink positioning anchor devices from the plurality of sidelink positioning anchor devices, wherein the one or more parameters include at least one of a reference signal received power (RSRP) measurement associated with each of the plurality of sidelink positioning anchor devices, a distance measurement associated with each of the plurality of sidelink positioning anchor devices, a line of sight measurement associated with each of the plurality of sidelink positioning anchor devices, an anchor device capability associated with each of the plurality of sidelink positioning anchor devices, and an anchor device category associated with each of the plurality of sidelink positioning anchor devices.

16. The wireless communication device of claim 15, wherein the at least one or more processors is further configured to:
determine the one or more parameters associated with each of the plurality of sidelink positioning anchor devices.

17. The wireless communication device of claim 15, wherein the at least one or more processors is further configured to:
receive, from the plurality of sidelink positioning anchor devices, the one or more parameters associated with each of the plurality of sidelink positioning anchor devices.

18. The wireless communication device of claim 15, wherein the RSRP measurement associated with each of the plurality of sidelink positioning anchor devices corresponds to at least one of a demodulation reference signal (DMRS), a channel state information reference signal (CSI-RS), a sounding reference signal (SRS), and a positioning reference signal (PRS).

19. The wireless communication device of claim 18, wherein the at least one processor is further configured to:
associate the wireless communication device with the one or more sidelink positioning anchor devices based on one or more RSRP measurements of the one or more sidelink positioning anchor devices being greater than one or more RSRP measurements of other sidelink positioning anchor devices of the plurality of sidelink positioning anchor devices.

20. The wireless communication device of claim 15, wherein the at least one processor is further configured to:
associate the wireless communication device with the one or more sidelink positioning anchor devices from the plurality of sidelink positioning anchor devices based on one or more RSRP measurements of the one or more sidelink positioning anchor devices being greater than an RSRP measurement threshold value.

21. The wireless communication device of claim 15, wherein the distance measurement associated with each of the plurality of sidelink positioning anchor devices is based on at least one of a geolocation associated with each of the plurality of sidelink positioning anchor devices and a zone identifier associated with each of the plurality of sidelink positioning anchor devices.

22. The wireless communication device of claim 15, wherein the at least one processor is further configured to:
associate the wireless communication device with the one or more sidelink positioning anchor devices based on one or more distance measurements of the one or more sidelink positioning anchor devices being less than one or more distance measurements of other sidelink positioning anchor devices of the plurality of sidelink positioning anchor devices.

23. The wireless communication device of claim 15, wherein the anchor device capability associated with each of the plurality of sidelink positioning anchor devices includes at least one of a number of receiving antennas, a maximum transmission bandwidth, a maximum number of component carriers, and a transmission power class associated with each of the plurality of sidelink positioning anchor devices.

24. The wireless communication device of claim 15, wherein the at least one processor is further configured to:
transmit the one or more parameters to a network entity; and
receive an indication of the one or more sidelink positioning anchor devices from the network entity.

25. A method for wireless communications, comprising:
receiving, by a network entity from a user equipment (UE), one or more parameters corresponding to a plurality of sidelink positioning anchor devices;
selecting, based on the one or more parameters, a subset of sidelink positioning anchor devices from the plurality of sidelink positioning anchor devices, wherein the subset of sidelink positioning anchor devices are associated with the UE for sidelink positioning, wherein the one or more parameters include at least one of a reference signal received power (RSRP) measurement associated with each of the plurality of sidelink positioning anchor devices, a distance measurement associated with each of the plurality of sidelink positioning anchor devices, a line of sight measurement associated with each of the plurality of sidelink positioning anchor devices, an anchor device capability associated with each of the plurality of sidelink positioning anchor devices, an anchor device category associated with each of the plurality of sidelink positioning anchor devices, an identifier associated with each of the plurality of sidelink positioning anchor devices, an identifier associated with the UE, and a timestamp indicating a time associated with measurement of the one or more parameters; and transmitting an indication of the subset of sidelink positioning anchor devices to the UE.

26. A base station for wireless communication, comprising:

one ore more memories; and one or more processors coupled to the one or more memories and configured to:

receive, from a user equipment (UE), one or more parameters corresponding to a plurality of sidelink positioning anchor devices, wherein the one or more parameters include at least one of a reference signal received power (RSRP) measurement associated with each of the plurality of sidelink positioning anchor devices, a distance measurement associated with each of the plurality of sidelink positioning anchor devices, a line of sight measurement associated with each of the plurality of sidelink positioning anchor devices, an anchor device capability associated with each of the plurality of sidelink positioning anchor devices, an anchor device category associated with each of the plurality of sidelink positioning anchor devices, an identifier associated with each of the plurality of sidelink positioning anchor devices, an identifier associated with the UE, and a timestamp indicating a time associated with measurement of the one or more parameters;

select, based on the one or more parameters, a subset of sidelink positioning anchor devices from the plurality of sidelink positioning anchor devices, wherein the subset of sidelink positioning anchor devices are associated with the UE for sidelink positioning; and transmit an indication of the subset of sidelink positioning anchor devices to the UE.

* * * * *